United States Patent
Agrawal et al.

[11] Patent Number: 6,039,390
[45] Date of Patent: Mar. 21, 2000

[54] CHROMOGENIC WINDOW ASSEMBLY CONSTRUCTION AND OTHER CHROMOGENIC DEVICES

[75] Inventors: Anoop Agrawal; Juan Carlos Lopez Tonazzi; Robert Steven LeCompte, all of Tucson, Ariz.; Carl Baertelin, Santa Barbara, Calif.; Douglas Alan Fischer, Grand Rapids, Mich.

[73] Assignee: Donnelly Corporation, Mich.

[21] Appl. No.: 08/914,876

[22] Filed: Aug. 20, 1997

Related U.S. Application Data

[63] Continuation-in-part of application No. 08/699,940, Aug. 20, 1996, abandoned.

[51] Int. Cl.⁷ .................................................. B60J 1/20
[52] U.S. Cl. .................... 296/211; 296/215; 52/786.1; 52/171.3; 349/16
[58] Field of Search .................................. 296/211, 215; 52/786.1, 786.11, 786.12, 171.3; 349/16

[56] References Cited

U.S. PATENT DOCUMENTS

| Re. 30,835 | 12/1981 | Giglia | 350/357 |
|---|---|---|---|
| 3,521,941 | 7/1970 | Deb et al. | 350/160 |
| 3,807,832 | 4/1974 | Castellion | 350/160 R |
| 4,164,365 | 8/1979 | Saxe | 350/362 |
| 4,174,152 | 11/1979 | Giglia et al. | 350/357 |
| 4,217,391 | 8/1980 | Kaltz | 296/215 |
| 4,268,126 | 5/1981 | Mumford . | |
| 4,306,769 | 12/1981 | Martinet . | |
| 4,338,000 | 7/1982 | Kamimori et al. | 350/357 |
| 4,475,031 | 10/1984 | Mockovciak, Jr. | 349/16 |
| 4,652,090 | 3/1987 | Uchikawa et al. | 350/357 |
| 4,671,619 | 6/1987 | Kamimori et al. | 350/357 |
| 4,702,566 | 10/1987 | Tukude | 350/357 |
| 4,712,879 | 12/1987 | Lynam et al. | 350/357 |
| 4,749,261 | 6/1988 | McLaughlin et al. | 349/16 |
| 4,750,816 | 6/1988 | Ito et al. | 350/357 |
| 4,793,690 | 12/1988 | Gahan et al. | 350/279 |
| 4,799,768 | 1/1989 | Gahan | 250/279 |

(List continued on next page.)

FOREIGN PATENT DOCUMENTS

| 698472 | 11/1964 | Canada | 52/786.1 |
|---|---|---|---|
| 0238164 | 9/1987 | European Pat. Off. . | |
| 3816069 | 11/1989 | Germany . | |
| 58-20729 | 2/1983 | Japan . | |
| 32521 | 2/1984 | Japan | 296/211 |
| 63-106730 | 5/1988 | Japan . | |
| 63-106731 | 5/1988 | Japan . | |
| 1215621 | 8/1989 | Japan | 296/211 |
| 0282021 | 11/1989 | Japan | 296/211 |
| 2055942 | 3/1981 | United Kingdom | 52/786.1 |
| 2268595 | 1/1994 | United Kingdom . | |
| 9624882 | 8/1996 | WIPO . | |

OTHER PUBLICATIONS

Lampert, C., "Electrochromic Materials and Devices for Energy Efficient Windows", Solar Energy Materials, 11, pp. 1–27 (1984).

Lynam, N., "Electrochromic Automotive Day/Night Mirrors", SAE Technical Paper Series, No. 87036 (1987).

Lynam, N., et al. "Automotive Applications of Chromogenic Materials" in "Large Area Chromogenics: Materials and Devices for Transmittance Control", Lampert, C. et al., eds., SPIE Institute Series, vol. IS4 (1989).

(List continued on next page.)

*Primary Examiner*—Dennis H. Pedder
*Attorney, Agent, or Firm*—Fitzpatrick, Cella, Harper & Scinto

[57] ABSTRACT

A chromogenic window panel assembly, and a chromogenic skylight each includes an outer panel and a chromogenic member having an optical property which varies according to an applied signal. A chromogenic light pipe includes a light harvesting member and a chromogenic member having an optical property which varies according to an applied signal. A chromogenic vehicle sunroof, a chromogenic aircraft window assembly, and a chromogenic window assembly each includes a panel having a particular panel contour corresponding to a surface contour and a chromogenic panel having an optical property which varies according to an applied signal. A chromogenic block includes two panels and a chromogenic panel having an optical property which varies according to an applied signal.

63 Claims, 25 Drawing Sheets

U.S. PATENT DOCUMENTS

| | | |
|---|---|---|
| 5,007,718 | 4/1991 | Minoura et al. ............................ 350/357 |
| 5,009,044 | 4/1991 | Baughman et al. ..................... 52/171.3 |
| 5,066,112 | 11/1991 | Lynam et al. ............................ 359/267 |
| 5,073,012 | 12/1991 | Lynam ..................................... 359/265 |
| 5,076,673 | 12/1991 | Lynam et al. ............................ 359/271 |
| 5,076,674 | 12/1991 | Lynam ..................................... 359/274 |
| 5,122,647 | 6/1992 | Lynam .................................. 250/201.1 |
| 5,142,407 | 8/1992 | Varaprasad et al. ..................... 359/276 |
| 5,148,014 | 9/1992 | Lynam et al. ..................... 250/214 AL |
| 5,220,317 | 6/1993 | Lynam et al. ............................ 340/785 |
| 5,233,461 | 8/1993 | Dornan et al. . |
| 5,239,406 | 8/1993 | Lynam ..................................... 359/275 |
| 5,241,411 | 8/1993 | Arribart et al. .......................... 359/269 |
| 5,261,722 | 11/1993 | Staley et al. ............................ 296/211 |
| 5,377,037 | 12/1994 | Branz et al. ............................. 359/265 |
| 5,384,578 | 1/1995 | Lynam et al. ............................ 345/105 |
| 5,424,865 | 6/1995 | Lynam ..................................... 359/270 |
| 5,424,898 | 6/1995 | Larson et al. ............................ 361/101 |
| 5,434,371 | 7/1995 | Brooks ....................................... 178/18 |
| 5,466,037 | 11/1995 | De Lena .................................. 296/211 |
| 5,472,643 | 12/1995 | Varaprasad et al. ..................... 252/583 |
| 5,524,955 | 6/1996 | Brocke et al. ........................ 52/786.12 |
| 5,589,958 | 12/1996 | Lieb ........................................... 349/16 |
| 5,763,050 | 6/1998 | Hirmer ..................................... 296/211 |

OTHER PUBLICATIONS

Basturk, N., et al. "Liquid Crystal Guest Host Devices and Their Use as Light Shutters", in "Large Area Chromogenics: Materials and Devices for Transmittance Control", Lamptert, C., et al., eds., SPIE Institute Ser. vol. IS4 (1989).

Lynam, N., "Smart Windows for Automobiles", SAE Technical Paper Series, No. 900419 (1990).

"Solar Ventilates, Recharges Vehicle", from Photonics Spectra, vol. 25, p. 20 (Dec. 1991).

"Heat and Light Transmission are Automatically Controlled", plasticsBrief vol. XX, No. 16, pp. 1, 3 (Apr. 22, 1996).

Chahroudi, D., "Is the Time for Smart Windows Here?", Glass Digest pp. 54–57 (May 15, 1996).

Sapers, S., et al. "Monolithic Solid–State Electrochromic Coatings for Window Applications", Proc. Soc. Vacuum Coaters, 39th Tech. Conf. (1996).

Jin, P. et al., "The Formation of $V_{1-x}W_xO_2$ Thermochromic Films By Reactive Magnetron Sputtering With an Alloy Target," SPIE vol. 2531, pp. 51–58.

Watanabe, H., "Intelligent Windows Using New Thermotropic Layers With Long–Term Stability", SPIE vol. 2531, pp. 42–50.

Goldner, R.B., et al., "A Monolithic Thin–Film Electrochromic Window", Solid State Ionics, vol. 53–56, Pt. 1, Jul. 1, 1992, pp. 617–627.

Benson, D.K., et al., "Design Goals and Challenges for a Photovoltaic–Powered Electrochromic Window Covering", Solar Energy Materials and Solar Cells, vol. 39, No. 2, Dec. 1, 1995, pp. 203–211.

Donnadieu, A., "Electrochromic Materials", Materials Science and Engineering B, vol. B3, No. 1–2, Jul. 1989, pp. 185–195.

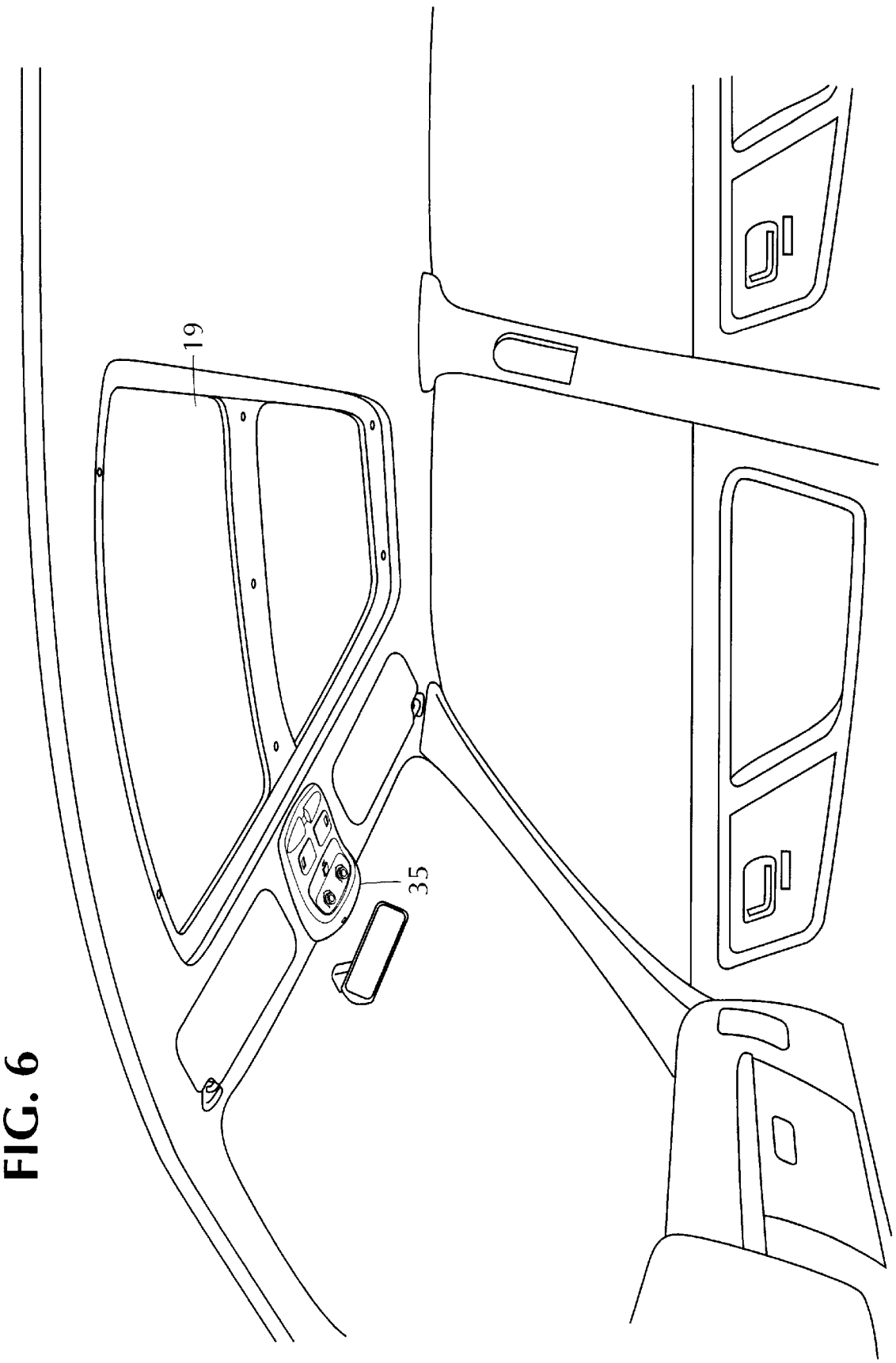

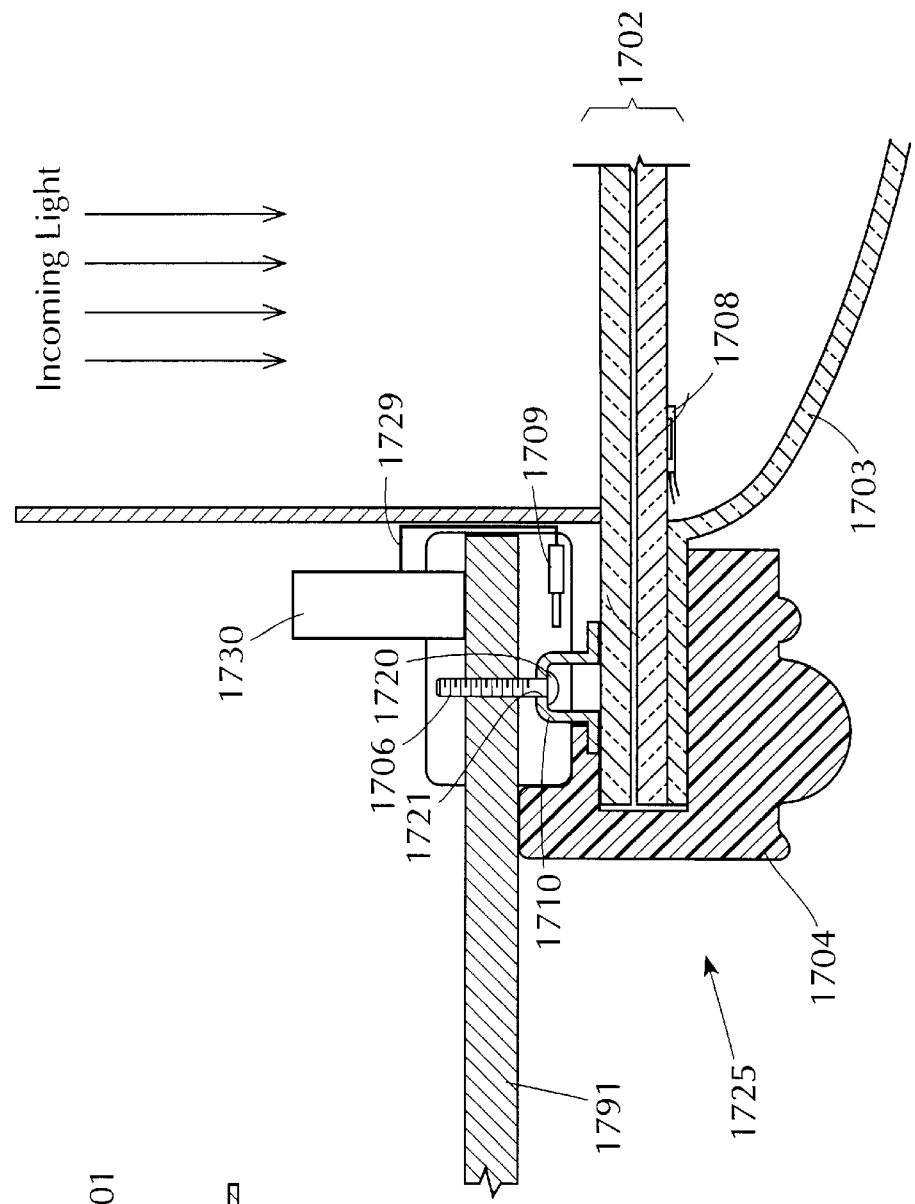
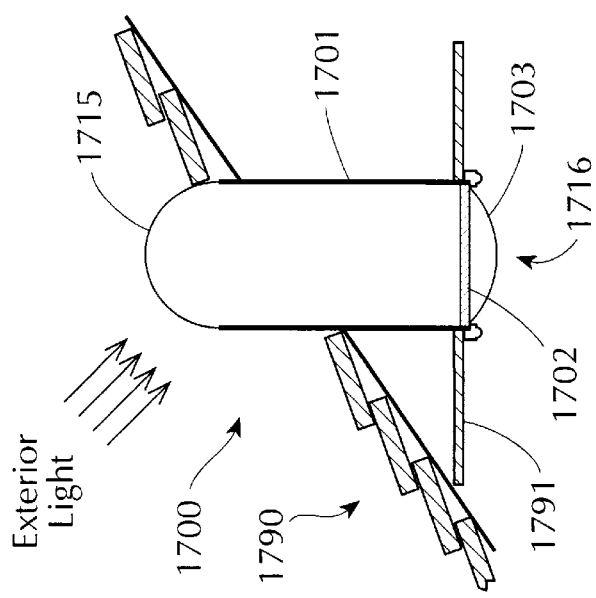
FIG. 17B
FIG. 17A

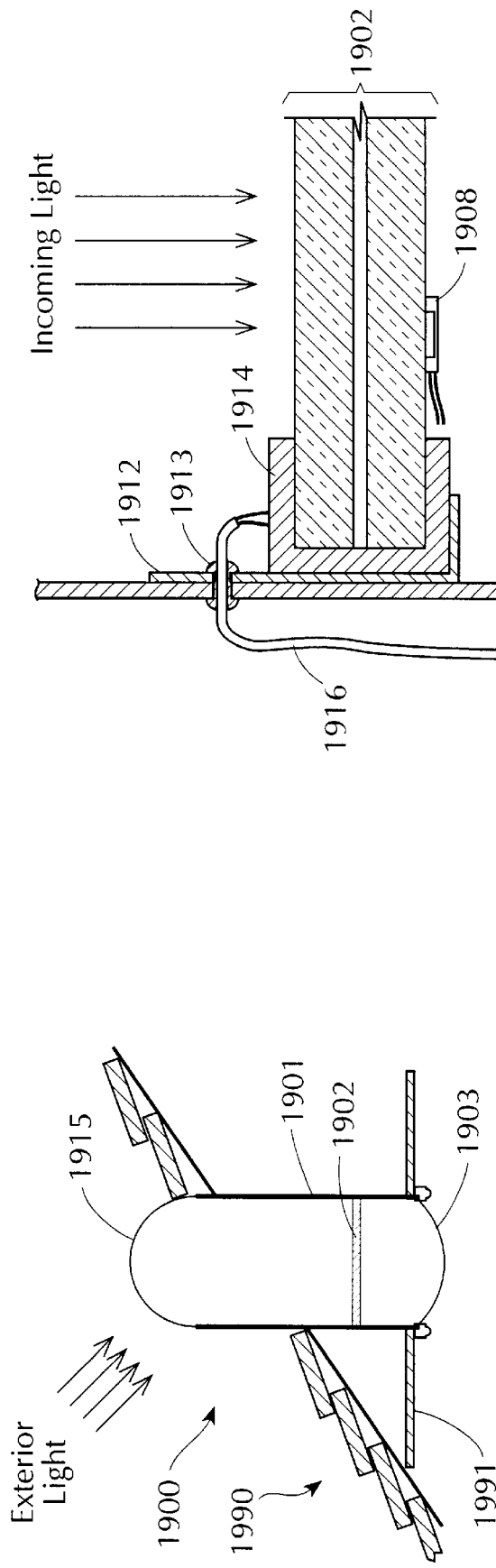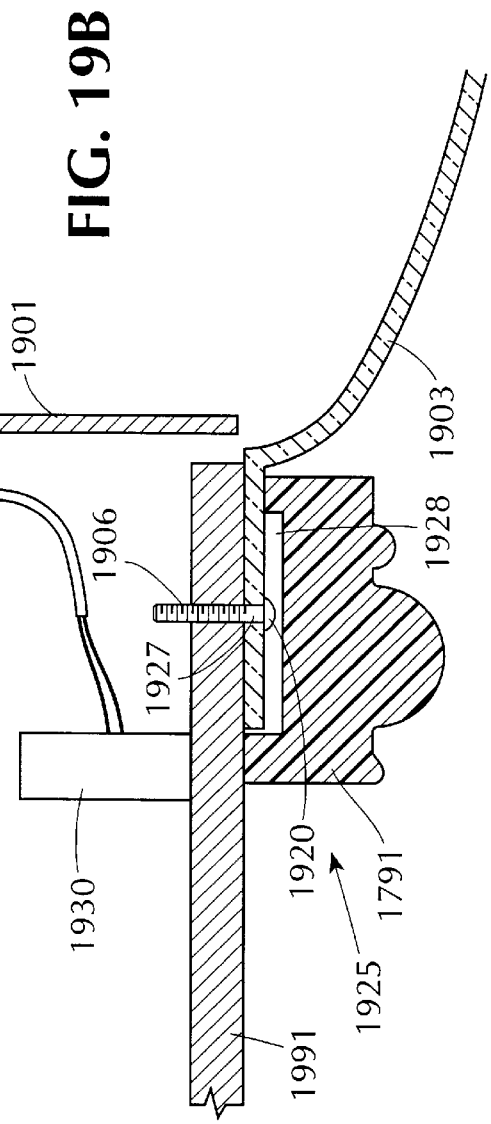

Reflected Light

CHROMOGENIC WINDOW ASSEMBLY CONSTRUCTION AND OTHER CHROMOGENIC DEVICES

This is a Continuation-in Part of application Ser. No. 08/699,940, filed Aug. 20, 1996, now abandoned.

BACKGROUND OF THE INVENTION

1. Field of the Invention

This invention pertains to chromogenic panels, such as glass windows, for vehicular and architectural use, and more particularly, to a chromogenic assembly for use in a vehicle's sunroof. In addition, the invention pertains to chromogenic skylights, architectural blocks and window assemblies. Further, the present invention pertains to chromogenic light pipes and chromogenic aircraft windows. The present invention also pertains to boat or other marine application windows.

2. Related Background Art

A variety of technologies exist for producing chromogenic members. "Chromogenic devices", as used herein, is employed as commonly known in the art. Examples of these chromogenic devices include electrochromic devices, photochromic devices, liquid crystal devices, user-controllable-photochromic devices, polymer-dispersed-liquid-crystal devices, and suspended particle devices.

The term "user-controllable" is used in the sense that the appearance of a chromogenic device can be regulated. Photochromic devices, because their coloration is a function of light intensity are not directly "user-controllable". However, systems incorporating such photochromic devices can be designed in which users can regulate such devices. For the purposes of this application, those systems would also be considered "user-controllable".

For example, electrochromic devices are discussed by N. R. Lynam and A. Agrawal in "Automotive Applications of Chromogenic Materials", *Large Area Chromogenics: Materials & Devices for Transmittance Control*, C. M. Lampert and C. G. Granqvist, Eds., Optical Engineering Press, Bellingham, Wash. (1989), the contents of which are incorporated by reference herein, and by D. V. Varaprasad, H. R. Habibi, N. R. Lynam and P. Desaraju in U.S. Pat. No. 5,142,407, entitled "Method of Reducing Leakage Current in Electrochemichromic Solutions Based Thereon", U.S. Pat. No. 4,793,690, entitled "Rearview Mirror Control Circuit", U.S. Pat. No. 4,799,768, entitled "Automatic Rearview Mirror With Filtered Light Sensors". Other pertinent references include N. R. Lynam, "Electrochromic Automotive Day/Night Mirrors", *SAE Technical Paper Series*, 87036 (1987); N. R. Lynam, "Smart Windows for Automobiles", *SAE Technical Paper Series*, 900419 (1990); C. M. Lampert, "Electrochromic Devices and Devices for Energy Efficient Windows", *Solar Energy Materials*, 11, 1–27 (1984); Japanese Patent Document No. JP 58-20729 (Kamimori); U.S. Pat. No. 3,521,941 (Deb); U.S. Pat. No. 3,807,832 (Castellion); U.S. Pat. No. 4,174,152 (Giglia); U.S. Pat. No. Re. 30,835 (Giglia); U.S. Pat. No. 4,338,000 (Kamimori); U.S. Pat. No. 4,652,090 (Uchikawa); U.S. Pat. No. 4,671,619 (Kamimori); U.S. Pat. No. 4,702,566 (Tukude); U.S. Pat. No. 4,712,879 (Lynam); U.S. Pat. No. 5,066,112 (Lynam) and U.S. Pat. No. 5,076,674 (Lynam), U.S. Pat. No. 5,239,406 (Lynam), U.S. Pat. No. 5,073,012 (Lynam), U.S. Pat. No. 5,122,647 (Lynam) and U.S. Pat. No. 5,148,014 (Lynam, et al.), the contents of each of which are incorporated by reference herein.

Electrochromic panels are also discussed by Sapers, S. P., et al. in "Monolithic Solid-State Electrochromic Coatings for Window Applications", Proceedings of the Society of Vacuum Coaters Conference (1996), with regard to devices of the type shown in FIG. 1E. Devices comparable to that shown in FIG. 1E, and having photovoltaic layers for self-biasing operation are described in U.S. Pat. No. 5,377,037, entitled "Electrochromic-Photovoltaic Film for Light-Sensitive Control of Optical Transmittance".

Other references of interest include U.S. Pat. No. 5,241,411, entitled "Electrochromic Variable Transmission Glazing, U.K. Patent No. 2,268,595, entitled "Electrochromic Cell", Japanese Laid-Open Patent Appln. No. 63-106731, entitled "Dimmer Body", Japanese Laid-Open Patent Appln. No. 63-106730, entitled "Dimmer Body", and U.S. Pat. No. 5,472,643, entitled "Electrochemichromic Sunroof". Also pertinent is PCT Patent Application No. PCT/US 97/05791, entitled "Electrochromic Devices", which pertains to electrochromic devices that can vary the transmission or reflection of electromagnetic radiation by applying an electrical stimulus to an EC device. This is done using a selective ion transport layer in combination with an electrolyte having at least one redox active material to provide a high-performance device.

Photochromic devices are discussed by N. R. Lynam and A. Agrawal in "Automotive Applications of Chromogenic Materials", *Large Area Chromogenics: Materials & Devices for Transmittance Control*, C. M. Lampert and C. G. Granqvist, Eds., Optical Engineering Press, Bellingham, Wash. (1989).

Also suitable for use in this invention are liquid crystal devices such as those described by N. Basturk and J. Grupp in "Liquid Crystal Guest-Host Devices and Their Use as Light Shutters", *Large Area Chromogenics: Materials & Devices for Transmittance Control*, C. M. Lampert and C. g. Granqvist, Eds., Optical Engineering Press, Bellingham, Wash. (1989).

User-controllable-photochromic devices (UCPC) are discussed in U.S. Pat. No. 5,604,626, entitled "Novel Photochromic Devices", the contents of which are incorporated by reference herein.

Polymer-dispersed-liquid-crystal (PDLC) devices are described by N. R. Lynam and A. Agrawal, "Automotive Applications of Chromogenic Materials", *Large Area Chromogenics: Materials & Devices for Transmittance Control*, C. M. Lampert and C. G. Granqvist, Eds., Optical Engineering Press, Bellingham, Wash. (1989).

Suspended particle devices are discussed in U.S. Pat. No. 4,164,365, entitled "Light Valve for Controlling the Transmission of Radiation Comprising a Cell and a Stabilized Liquid Suspension" (Saxe), the contents of which are incorporated by reference herein.

The general control of chromogenic devices is discussed in U.S. Pat. No. 4,793,690, entitled "Rearview Mirror Control Circuit", U.S. Pat. No. 4,799,768, entitled "Automatic Rearview Mirror With Filtered Light Sensors", U.S. Pat. No. 5,007,718, entitled "Electrochromic Elements and Methods of Manufacturing and Driving the Same", and U.S. Pat. No. 5,424,898, entitled "Fault Tolerant Drive Circuit for Electrochromic Mirror System", and the disclosure of those references is incorporated by reference herein.

The phenomenon of prolonged coloration of chromogenic devices is discussed in U.S. Pat. No. 5,076,673, entitled "Prolonged Coloration Electrochromic Assembly", U.S. Pat. No. 5,220,317, entitled "Electrochromic Device Capable of Prolonged Coloration", and U.S. Pat. No. 5,384,578, entitled "Electrochromic Device Capable of Prolonged Coloration". The disclosure of those references is incorporated by reference herein.

FIGS. 1A through 1E depict typical examples of electrochromic devices, while FIGS. 1F through 1H show other types of chromogenic devices.

For example, FIG. 1A depicts a layered EC device which includes a substrate 101, transparent conductor 103, electrochromic (redox) medium 105, transparent conductor 103' and substrate 101'.

FIG. 1B illustrates a layered EC device which includes a substrate 101, transparent conductor 103, EC layer 107, electrolyte (redox medium) 109, transparent conductor 103' and substrate 101'.

FIG. 1C shows another layered EC device having a substrate 101, transparent conductor 103, EC layer 107, ion-selective transport layer 111, electrolyte (redox medium) 109, transparent conductor 103' and substrate 101'.

Still another such EC device is shown in FIG. 1D. This device includes a substrate 101, transparent conductor 103, EC layer 107, electrolyte 113, counterelectrode 115, transparent conductor 103' and substrate 101'.

FIG. 1E shows an EC device having a substrate 101, transparent conductor 103, EC layer 107, electrolyte (ion-conductive layer) 117, counterelectrode 115 and transparent conductor 103'.

A typical liquid crystal or PDLC device is shown in FIG. 1F; this device includes a substrate 201, transparent conductor 203, liquid crystal or PDLC medium 205, transparent conductor 203' and substrate 201'.

Another example of a typical liquid crystal device is depicted in FIG. 1G. The device includes a polarizer 207, substrate 201, transparent conductor 203, alignment layer 209, liquid crystal medium 205, alignment layer 209', transparent conductor 203', substrate 201' and polarizer 207'.

An example of a UCPC device is shown in FIG. 1H, and this device contains a substrate 201, transparent conductor 203, chromogenic layer 211, electrolyte (redox) medium 210, transparent conductor 203', light-sensitive electrode 213 and substrate 201'.

FIG. 1I shows a typical photochromic device. It includes a substrate 301, photochromic medium 303 and substrate 301'.

FIG. 1J shows another typical photochromic device. The device has a substrate 301 and photochromic layer 303.

Yet another typical photochromic device is shown in FIG. 1K; this consists of a photochromic substrate 305.

Since these chromogenic devices are themselves known to those skilled in the art, a detailed explanation of their manner of construction and operation is not believed to be necessary.

Vehicular sunroofs have become an increasingly popular automotive option in recent years. These devices provide the vehicle occupants with a feeling of open-air driving, increase air circulation through the passenger compartment, and add a sporty appearance to the vehicle. The typical automobile sunroof constitutes a glass panel which allows occupants to have an open view through the roof of the vehicle even when the sunroof is itself closed.

While in many ways desirable, sunroofs affect the interior design of automobiles. Many vehicles include, at least as an option, an overhead console for the storage of sunglasses and other items and vehicle accessories such as garage door opening transmitters, overhead lights, and compass displays. Typically, a vehicle with a sunroof has only a relatively small area between the windshield and the forward edge of the sunroof opening for such an overhead console. This space is undesirably small, however, and offers much less room than that is found in the larger overhead consoles available in vehicles without a sunroof.

Glass sunroofs transmit a great deal of heat and light, particularly under sunny conditions or in warm climates. For example, it has been found that the interior temperature of a vehicle parked in the sun for two hours can exceed 167° F. ("Solar Ventilates, Recharges Vehicle", *Photonics Spectra*, Vol. 25, p. 20 (1991)). This causes overheating of the interior of the vehicle. Such overheating can be a serious problem, because recently-required changes in the types of refrigerants which can be used in automotive air conditioning systems reduce the cooling ability and so cause the vehicles to cool more slowly. Therefore, the flow of heat through the glass portions of the car has become an increasingly important concern for car designers.

High solar light levels also may fill the car with ultraviolet, visible and infrared radiation. Visible radiation causes glare which is undesirable because at the least, it constitutes an annoyance to the occupants. Also, ultraviolet radiation may bleach or discolor the vehicle's interior. The incoming infrared radiation leads to heat buildup with consequent occupant discomfort and deterioration of interior cabin materials.

Chromogenic technology such as electrochromic technology has been described in the prior art as having the potential for application to automotive sunroofs. Many electrochromic systems effectively block the transmission of infrared radiation in their darkened state. Thus, electrochromic elements will effectively prevent solar heat gain in vehicles and will provide the user with dynamic control of the transmissive properties of the glass roof. Sunroof designs may feature glass sunroofs with both electric tilt and slide functions.

In designing a chromogenic sunroof, it may be preferable to integrate the electronics which control the coloring and bleaching of the device with those which control the slide and tilt mechanisms. This would permit greater ease of installation, a more compact unit, and reduce the likelihood of failure.

According to the prior art, chromogenic glass panels, if used for a sunroof, are installed directly in the roof opening. See U.S. Pat. No. 5,261,722, entitled "Variable Opacity, Maximally Transverse Retracting Sunroof System", and U.S. Pat. No. 4,750,816, entitled "Electrochromic Element Comprising an Organic Oxidative Color-Forming Layer and an Inorganic Reductive Color-Forming Layer". One issue of concern in such designs is that the chromogenic elements are exposed to environmental factors such as direct ultraviolet ("UV") light, temperature fluctuations and extremes, rain and dust. Such chromogenic elements also can be struck by debris kicked up on the road, i.e., gravel and rocks, and so could be damaged. In addition, from the standpoint of manufacturing efficiency, economy and customer satisfaction, it is difficult to make chromogenic components having the same shape as existing sunroofs, which have curvatures matching the contours of the vehicles in which the sunroofs are installed. Hence, most chromogenic devices such as laminate-type electrochromic devices involve a construction comprising glass substrates sandwiching a chromogenic medium (such as an electrochromic medium). It is more economical and manufacturable to fabricate flat panels of area larger than about one square foot or thereabout. By sandwiching the chromogenic medium between two flat panels, this obviates the need for precision bending and matching of two curved panels. The term contour as used herein means a non-flat surface, i.e., a curved surface.

For example, the outer skin of a vehicle such as the outer skin of the vehicle roof is typically contoured such that it is non-flat and is curved and is frequently of compound and complex curvature (here, "contoured" means "curved"). Furthermore, retrofitting by installing chromogenic panels in existing sunroofs without altering the car appearance is quite complicated. Similar problems would also be encountered with aircraft windows.

Light pipes are frequently used in buildings to harness exterior light and direct the light to the interior of the building. The light may be diffusely delivered. Light pipes are similar to skylights insofar as they both use natural light to brighten a room. However, skylights are often more difficult and expensive to install in a retrofit situation than light pipes.

The main element of a light pipe is a circular tube, typically of metal. The inside surface may be coated with a reflective mirror finish. The tube which is typically 3–6 feet in length and extends through the roof where it is covered by a clear cover, typically an acrylic dome. A small reflector located inside or outside the tube can help direct light down the tube. Inside, the tube ends at the ceiling surface, where it is typically covered with a diffuser that spreads light across the interior area. Since the reflective tubing may be fitted between ceiling joists, thereby avoiding major construction, they represent an inexpensive retrofit option.

The use of light pipes decreases the reliance on other forms of artificial lighting and hence reduces energy bills. However, light pipes have mainly been installed in areas such as hallways and bathrooms, where the presence of very bright light throughout daylight hours is not detrimental. Light pipes could have wider application if there existed a means to selectively darken the light pipe when bright lighting was not desired. Such control of the light output of light pipes can lead to installation of light pipes in other areas such as, for example, bedrooms, conference rooms, theatres, multimedia rooms, multipurpose rooms, and offices.

One method to control the light output of light pipes is to install shades or screens which could be used to cover the light pipe to achieve relative darkness. However this method has several drawbacks such as a narrow selectivity range of brightness intensity, a difficulty in reaching a shade at roof height, and a poor aesthetic appearance.

Such problems with conventional light pipes are addressed by the present invention by providing an electrochromic panel which is fabricated for insertion in a light pipe. The electrochromic panel of the present invention could be selectively darkened to achieve any number of levels of brightness in the room. The panel could be controlled from a wall switch mounted near the unit. These and other advantages will be described in the embodiments described below.

The invention described below addresses all the above issues by providing more flexibility for glazing design, and particularly for automotive glazing, aircraft windows, and interior design. The present invention also provides novel methods and structures for making chromogenic sunroofs as well as other glazing structures for both vehicular and architectural use, such as building skylights, architectural glass blocks, light pipes, car windows, aircraft windows, boat windows, marine applications, and building windows.

SUMMARY OF THE INVENTION

It is accordingly an object of the present invention to provide a chromogenic sunroof assembly which is composed of at least one outer non-chromogenic panel and one inner chromogenic panel. In constructing such a chromogenic sunroof assembly, any of the aforementioned chromogenic technologies could be used, and the preferred devices are those where a user can exercise control over the transmissive properties of the panel, such as electrochromic (EC), liquid-crystal (LC), polymer-dispersed-liquid crystal (PDLC), suspended particle devices, and user-controllable-photochromic devices (UCPC) devices. Of these devices, EC is preferred, followed by UCPC.

A further object of this invention is to provide a sunroof with an inner chromogenic panel and outer panels, the inner chromogenic panel being electrochromic in nature.

Still another object of this invention is to provide a chromogenic sunroof in which the outer panel of the sunroof is contiguous with the outer skin of the vehicle roof, and which outer panel is curved and shaped to suit the vehicle's appearance, whereas the inner, chromogenic panel is flat. This means that a flat chromogenic inner panel can be used, and only the outer panel, which serves a protective function, need be specially designed to match the contours of the vehicle roof.

It is yet another object of the present invention to provide a dual inner chromogenic panel design. A single outer panel is shaped to meet design requirements and is combined with one or more flat chromogenic panels that constitute the inner panels. The optical properties of these inner chromogenic panels can be individually controlled.

A further object of this invention is to provide a thermal break (barrier) between the outer and the inner panels of a chromogenic assembly. A thermal break can include any one of a gas-filled volume (such as with air, inert gas such as nitrogen, argon, krypton, sulfur hexafluoride), an evacuated volume such as a volume of a partial vacuum, an aerogel-filled volume, a xerogel-filled volume or an equivalent.

An additional object of the invention is to provide an ultraviolet barrier between the outer and the inner panels of multi-panel chromogenic assembly.

It is yet another object of the present invention to provide a multi-panel chromogenic sunroof with at least two inner panels which are separated by a roof console.

It is another object of the present invention to provide a sunroof assembly having a transparent outer panel.

It is a further object of the present invention to construct an existing standard sunroof with chromogenic panel(s).

It is yet another object of the present invention to provide a movable chromogenic sunroof assembly which is powered throughout its range of movement.

It is yet another object of the present invention to provide a movable chromogenic sunroof assembly which sunroof offers both tilt and slide operations.

It is yet another object of the invention to provide a chromogenic sunroof which is integrated with various sensors to provide for automatic operation.

It is also an object of the present invention to provide a chromogenic aircraft window assembly which is composed of at least one outer non-chromogenic panel and one inner chromogenic panel. In constructing such a chromogenic aircraft window assembly, any of the aforementioned chromogenic technologies could be used, and the preferred devices are those where a user can exercise control over the transmissive properties of the panel, such as electrochromic (EC), liquid-crystal (LC), polymer-dispersed-liquid crystal (PDLC), suspended particle devices, and user-controllable-photochromic devices (UCPC) devices. Of these devices, EC is preferred, followed by UCPC.

A further object of this invention is to provide a aircraft window with an inner chromogenic panel and outer panels, the inner chromogenic panel being electrochromic in nature.

Still another object of this invention is to provide a chromogenic aircraft window in which the outer panel of the aircraft window is contiguous with the outer skin of the aircraft, and which outer panel is curved and shaped to suit the aircraft's appearance and performance requirements, whereas the inner, chromogenic panel is flat. This means that a flat chromogenic inner panel can be used, and only the outer panel, which serves a protective and aerodynamic function, need be specially designed to match the contours of the aircraft body.

It is yet another object of the present invention to provide a chromogenic aircraft window in which the outer panel of the aircraft window is contiguous with the outer skin of the aircraft, and which outer panel is curved and shaped to suit the aircraft's appearance and performance requirements, and which an inner panel is curved and shaped to suit the aircraft interior's appearance, whereas the intermediate, chromogenic panel is flat. This means that a flat chromogenic inner panel can be used, and only the inner panel, which serves a protective function, and the outer panel which serves a pressure sealing function, need be specially designed to match the contours of the aircraft body.

It is another object of the present invention to provide an aircraft window assembly having a transparent outer panel.

It is a further object of the present invention to construct an existing standard aircraft window with chromogenic panel(s).

Still another object of this invention is to provide a skylight with an outer panel and at least one inner chromogenic panel which may optionally include a UV barrier or film disposed between two panels of the skylight.

Another object of the present invention is to provide a skylight with a volume enclosed by an outer panel and at least one inner chromogenic panel wherein the enclosed volume is in communication with a desiccant effective to prevent moisture condensation in the enclosed volume.

Yet another object of the present invention is to provide a skylight with an outer panel and at least one inner chromogenic panel rotatably movable effective to allow drainage of moisture condensation from a volume enclosed by the outer panel and at least one inner chromogenic panel.

Still another object of the present invention is to provide a skylight with an outer panel, at least one inner chromogenic panel, and a diffuser panel effective to diffuse light transmitted through the skylight.

Another object of this invention is to provide a block suitable for architectural use where the inner panel is chromogenic or the chromogenic panel is disposed on the inside of the block. Optionally, a UV barrier or film disposed between two elements of the block can be provided.

An object of the present invention is to provide a light pipe with an outer panel and at least one inner chromogenic panel which may optionally include a diffuser effective to diffuse light conducted through the light pipe.

Another object of the present invention is to provide a light pipe with an outer panel, at least one inner chromogenic panel, and an artificial light source effective to emit light from the light pipe.

These objects are at least in part accomplished by a chromogenic window panel assembly for installation in a surface having a contour, and which includes a chromogenic member optionally having an optical property which varies according to an applied signal, and an outer panel disposed proximate to the chromogenic member. This outer panel is dimensioned and disposed so as to overlap at least a substantial part of the chromogenic member, and has a contour corresponding to that of the surface. A user can supply the applied signal to the chromogenic member.

To further achieve these goals, a chromogenic vehicle sunroof for installation in a contoured vehicle surface has been invented, and includes a chromogenic member having an optical property which varies according to an applied signal, a driver for supplying the applied signal to the chromogenic member, and an outer panel disposed proximate to the chromogenic member. The outer panel is dimensioned and disposed to overlap at least a substantial part of the chromogenic member, and the outer panel has a predetermined panel contour corresponding to the vehicle surface contour.

So too, a chromogenic window assembly for installation in a contoured surface is disclosed which contains a chromogenic panel having an optical property which varies according to an applied signal, a protective panel disposed in relation to the chromogenic panel, this protective panel having a panel contour corresponding to the surface contour, and a connecting member to which both the chromogenic panel and protective panel are joined.

In furtherance of these objects, this application teaches a chromogenic window panel having at least one of a first sensor positioned proximate to an outer panel so as to measure an amount of radiation which has come from outside and passed through that outer panel, this first sensor outputting a first signal in response thereto, and a second sensor positioned proximate to a chromogenic member so as to measure an amount of radiation which has first passed through the outer panel and then passed through the chromogenic member. This second sensor outputs a second signal in response thereto. This window panel assembly may include a controller which generates the applied signal and applies the same to the chromogenic material so as to regulate the optical property of the chromogenic member.

If desired, the controller can receive at least one of the first signal output from the first sensor and the second signal from the second sensor and generate the applied signal in accordance therewith.

Still another aspect of this invention is a chromogenic vehicle sunroof for installation in a contoured vehicle surface, having at least one chromogenic member with an optical property that varies according to an applied signal, an outer panel proximate to the chromogenic member, this outer panel being dimensioned and disposed to overlap at least a substantial part of the chromogenic member, and a trim member having at least one opening, the opening corresponding in both position and shape to the position and shape of the chromogenic member, with a predetermined contour corresponding to the vehicle surface contour. The trim member overlaps and conceals at least a portion of the chromogenic member.

Another aspect of this invention pertains to a chromogenic vehicle sunroof to be installed in a vehicle roof surface having a surface contour. This sunroof includes a chromogenic member having first and second chromogenic panels, each chromogenic panel having an optical property which varies according to an applied signal, a position and a shape, and an outer panel disposed proximate to the chromogenic panels, this outer panel being dimensioned and disposed so as to overlap at least a substantial part of the chromogenic panels, and having a predetermined contour corresponding to the surface contour. A first control means controls the first chromogenic panel by varying the applied signal, and a second control means controls the second chromogenic panel by varying the applied signal. Each control means is preferentially accessible to a different occupant of said vehicle.

A further aspect of this invention relates to a chromogenic block which includes first and second panels, and a chromogenic member with an optical property that varies according to an applied signal, the chromogenic member being disposed between the first and second panels. By varying the optical property of the chromogenic member, the amount of radiation passing between the first and second panels can be regulated. The chromogenic member can be selected from the group consisting of electrochromic devices, photochromic devices, liquid crystal devices, user-controllable-photochromic devices, polymer-dispersed-liquid-crystal devices, and suspended particle devices.

The preferred devices are those for which users can exercise control over the devices' transmissive properties. The most preferred devices are EC and then UCPC.

In a further refinement, the chromogenic window panel includes a layer of a material disposed upon at least one of the chromogenic member and outer panel. In some cases, the layer of material changes an optical property or a physical property of the chromogenic window panel.

The term "optical property" is used in a very general manner, and includes a material's ability to transmit infrared, visible, and/or ultraviolet radiation.

According to an embodiment of the present invention, a chromogenic window panel assembly to be installed in a surface having a surface contour comprises a chromogenic member having an optical property which varies according to an applied signal, and an outer panel disposed proximate to the chromogenic member, the outer panel being dimensioned and disposed so as to overlap at least a substantial part of the chromogenic member, and having a panel contour corresponding to the surface contour.

According to another embodiment of the present invention, a chromogenic vehicle sunroof to be installed in a vehicle roof, the roof having a surface contour, comprises a chromogenic member having an optical property which varies according to an applied signal, and an outer panel disposed proximate to the chromogenic member, the outer panel being dimensioned and disposed so as to overlap at least a substantial part of the chromogenic member, the outer panel having a predetermined panel contour corresponding to the surface contour.

According to yet another embodiment of the present invention, a chromogenic window assembly to be installed in a surface having a surface contour comprises a chromogenic panel having an optical property which varies according to an applied signal, a protective panel disposed in relation to the chromogenic panel, the protective panel having a protective panel contour corresponding to the surface contour, and a connecting member to which both the chromogenic panel and the protective panel are joined.

According to still another embodiment of the present invention, a chromogenic vehicle sunroof to be installed in a vehicle surface having a surface contour comprises at least one of a chromogenic member having an optical property which varies according to an applied signal, a position and a shape, an outer panel disposed proximate to the chromogenic member, the outer panel being dimensioned and disposed so as to overlap at least a substantial part of the chromogenic member, and having a predetermined contour corresponding to the surface contour, and a trim member having at least one opening, the opening corresponding in both a position and a shape to the position and the shape of the chromogenic member, wherein the trim member overlaps and conceals at least a portion of the chromogenic member.

According to another embodiment of the present invention, a chromogenic block comprises a first panel, a second panel wherein at least one of the first and second panels has a curved surface, and a chromogenic member having an optical property which varies according to an applied signal, the chromogenic member being disposed between the first panel and the second panel, wherein by varying the optical property of the chromogenic member, an amount of radiation passing between the first panel and the second panel can be regulated.

According to still another embodiment of the present invention, a chromogenic vehicle sunroof to be installed in a vehicle roof surface having a surface contour comprises a chromogenic member comprising a first chromogenic panel and a second chromogenic panel, each the chromogenic panel having an optical property which varies according to an applied signal, and a position and a shape, an outer panel disposed proximate to the chromogenic panels, the outer panel being dimensioned and disposed so as to overlap at least a substantial part of the chromogenic panels, and having a predetermined contour corresponding to the surface contour, a first control means for controlling the first chromogenic panel by varying the applied signal, and a second control means for controlling the second chromogenic panel by varying the applied signal, wherein each the control means is preferentially accessible to a different occupant of the vehicle.

According to yet another embodiment of the present invention, a chromogenic skylight comprises a chromogenic member having an optical property which varies according to an applied signal, and an outer panel disposed proximate to the chromogenic member, the outer panel being dimensioned and disposed so as to overlap at least a substantial part of the chromogenic member.

According to still another embodiment of the present invention, a chromogenic light pipe comprises a hollow member having a first end and a second end, a light harvesting member effective to cause light to travel from the first end towards the second end, and a chromogenic member having an optical property which varies according to an applied signal, the chromogenic member disposed effective to affect the light traveling from the first end towards the second end.

According to another embodiment of the present invention, a chromogenic aircraft window to be installed in an aircraft, the aircraft having a surface contour, the chromogenic aircraft window comprises a chromogenic member having an optical property which varies according to an applied signal, and an outer panel proximate to the chromogenic member, the outer panel being dimensioned and at a position so as to overlap at least a substantial part of the chromogenic member, the outer panel having a predetermined panel contour corresponding to the surface contour.

Briefly stated, a chromogenic window panel assembly, and a chromogenic skylight each includes an outer panel and a chromogenic member having an optical property which varies according to an applied signal. A chromogenic light pipe includes a light harvesting member and a chromogenic member having an optical property which varies according to an applied signal. A chromogenic vehicle sunroof, a chromogenic aircraft window assembly, and a chromogenic window assembly each includes a panel having a particular panel contour corresponding to a surface contour and a chromogenic panel having an optical property which varies according to an applied signal. A chromogenic block includes two panels and a chromogenic panel having an optical property which varies according to an applied signal.

BRIEF DESCRIPTION OF THE DRAWINGS

FIG. 5A is a schematic cross-sectional view of a particularly preferred embodiment of a window construction which could be used in a vehicle, while

FIG. 6 is a perspective view of an automobile interior looking in from beside the driver's door, and which shows various aspects of the instant invention.

FIG. 8A is a side cross-sectional view of a connector system which could be used in the present invention, while

FIG. 17A is a schematic sectional view of a light pipe assembly mounted in a house with a sloped roof and a horizontal ceiling, while FIG. 17B is a close up schematic sectional view thereof at the mounting point to the interior ceiling.

FIG. 18A is a schematic plan view of a mounting hardware assembly for a light pipe, while

FIG. 19A is a schematic sectional view of a light pipe assembly, according to another embodiment of the present invention, mounted in a house with a sloped roof and a horizontal ceiling, while FIG. 19B is a schematic expanded close up partial sectional view thereof.

DESCRIPTION OF THE PREFERRED EMBODIMENTS

Figure 1B:
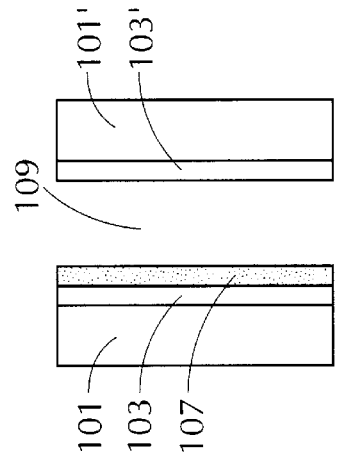
FIGS. 1A, 1B, 1C, 1D, 1E, 1F, 1G, 1H, 1I, 1J, and 1K are side cross-sectional views of a number of different known electrochromic, liquid crystal, PDLC, and photochromic devices suitable for use in the present invention.
Figure 1D:
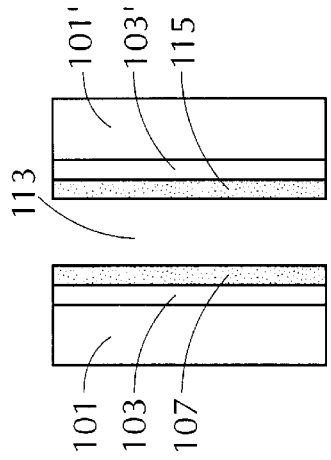
Figure 1E:
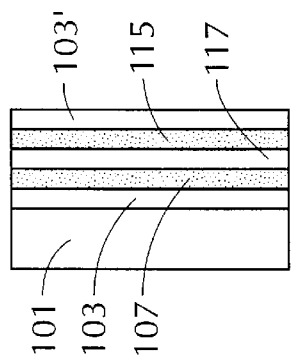
Figure 1A:
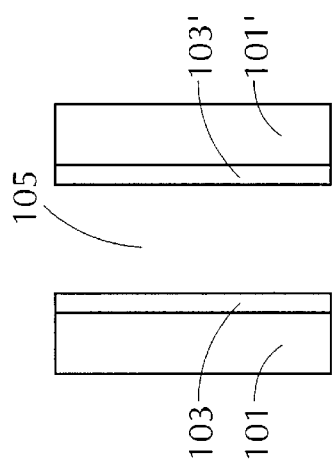
Figure 1C:
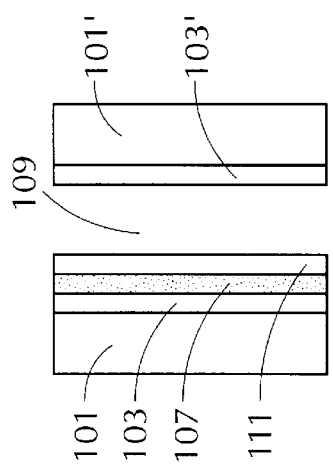
Figure 1G:
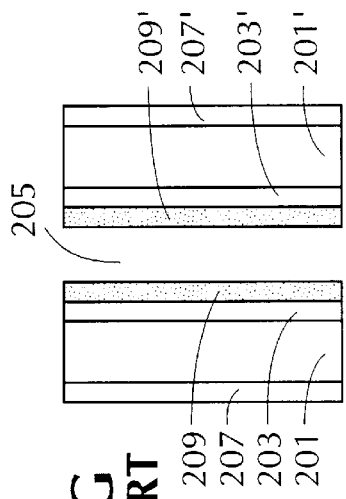
Figure 1I:
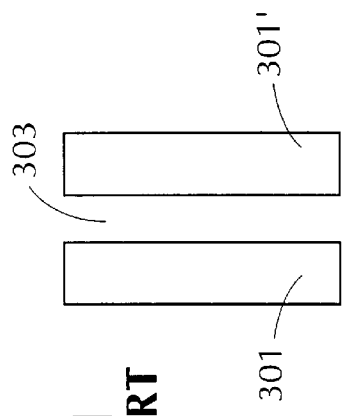
Figure 1K:
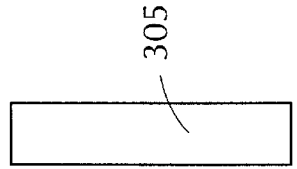
Figure 1F:
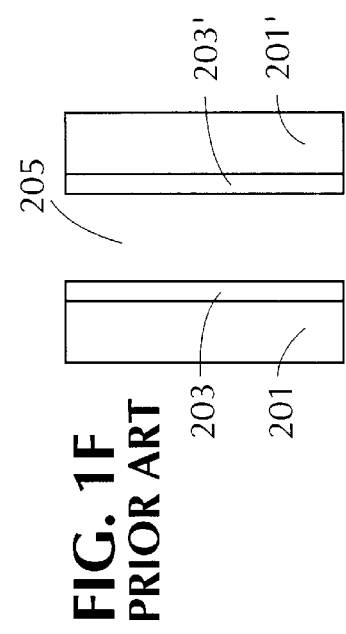
Figure 1H:
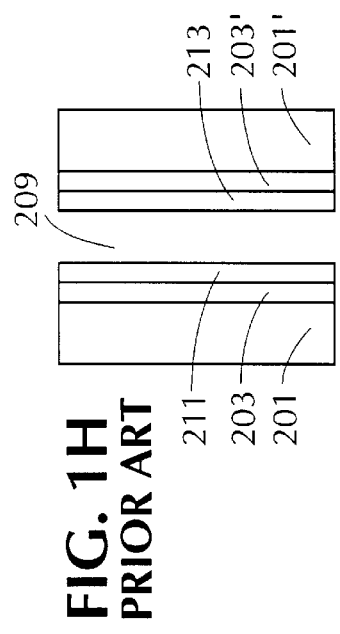
Figure 1J:
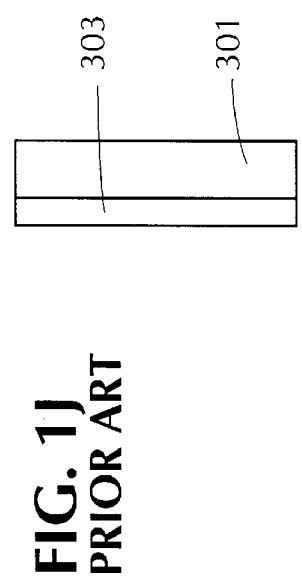

The chromogenic panel(s) used in this invention may be of the electrochromic, photochromic, liquid crystal (LC), user-controlled-photochromic (UCPC), polymer-dispersed-liquid crystal (PDLC), or suspended particle type. Since important aspects of this invention reside in the manner in which the window assemblies employing the chromogenic panels are formed and/or constructed, rather than in the precise way that chromogenicity is achieved, this invention is not limited to the aforementioned types of chromogenic panels. Chromogenic technologies not yet perfected, as well as chromogenic technologies not yet even developed, could be used in this invention.

The chromogenic panel should have a light-transmissive substrate, such as glass or plastic, which is preferably clear.

Chromogenic panels are panels which can be made to change their optical properties, typically by applying electricity, heat or light. It will be appreciated that certain types of chromogenic devices, such as thermochromic and/or photochromic devices, may have optical properties which vary as a consequence of temperature and/or incident light, but such devices nevertheless could be adapted for use in this invention by providing a suitable control system. Those skilled in the art will appreciate that for EC, LC and PDLC devices, such as those shown in FIGS. 1A–1G, optical properties can be controlled by applying electric power to the two opposing terminals defined by the two transparent conductors. For photochromic and UCPC devices such as those shown in FIGS. 1H–1K, optical properties can be controlled by subjecting the panels to light, such as solar radiation.

In the context of this invention, the preferred chromogenic panels are those having optical properties, such as color or opacity, which vary in response to an applied electrical signal, or are otherwise user-controllable. By controlling those optical properties the type and amount of light and/or other electromagnetic radiation passing through the chromogenic panels can be regulated so as to maintain a desired level.

For example, preferred chromogenic panels could be derived from EC, UCPC, LC, and PDLC technologies, as shown in FIGS. 1A–1K. These devices can be designed so that when colored to any desired extent, they will not show a significant change in the state of coloration even after the power is no longer applied. This retention of optical properties can last for a significant period of time, e.g., preferably greater than eight hours.

In all the examples of the present invention described below, the chromogenic panels and/or outer panels can have at least one layer of material disposed thereon or therebetween which changes either an optical property or a physical property of the overall chromogenic assembly. Such optical properties include the panel's ability to transmit (especially to reduce) solar radiation, to transmit (especially to reduce) ultraviolet radiation, to transmit (especially to reduce) visible light, to reduce reflection (an antireflective), to modify the spectrum of the incoming light (tinting), or to polarize the incoming light. The physical properties include the panel's ability to reflect heat, its surface hardness, and its E-coating properties, (such as a low-emissivity or low-E coating which serves to reduce the transmission of infrared radiation through the glass).

The chromogenic panel is protected by an outer protective panel, which may be composed of light-transmissive material such as glass or plastic. The transmissive material is preferably clear, but could also be opaque. Furthermore, the protective outer panel may conform to the shape of the vehicle roof, or the structure in which the window panels are mounted. Of course, other shapes could be used if so desired.

Further, to provide added safety in applications of the present invention, the surface of the chromogenic panel(s) facing the user of the application, and/or the surface of the chromogenic panels facing the protective outer panel can be contacted with a layer or multilayer of polymer such as a plastic material. Examples of such materials are recited in U.S. Pat. No. 5,239,406 (Lynam), previously discussed, and include a polyester/polyvinylbutyral composite layer and a reticulated polyurethane.

One example of such polyurethane is SECURIFLEX® material, manufactured by Saint-Gobain Vitrage. Another example is SPALLSHIELD®, a polyester sheet that has a hard coat (for scratch resistance) on one side and PVB (poly vinylbutyral) on the other manufactured by Dupont of Wilmington, Del., with the PVB laminated onto the glass.

Still another example is LEXAN®HP12W and HP92W, a polycarbonate sheet made by General Electric Plastics Structures Products of Pittsfield, Mass. This can be laminated onto the glass or it can be inserted between the chromogenic panels and the outer panel.

This way, should the panel break, the SECURIFLEX®, the LEXAN® LAYER or insert, or the SPALLSHIELD® layer will prevent pieces of glass or plastic from shattering into the user's space (and will also prevent leakage of material from the chromogenic, i.e. electrochromic, medium into the user's space). When such layers are placed on the surface of the chromogenic panel facing the protective outer panel, they can fulfill the dual beneficial role of providing safety protection and ultraviolet radiation reduction protection for the chromogenic medium. These materials may be incorporated onto the substrate before assembling the EC panels or they may be incorporated after assembling the EC panels. Standard lamination procedures such as autoclave which uses elevated pressure and temperature, a standard lamination autoclave process, could be used to incorporate these materials.

Although much of the following description of this invention is set forth in connection with an automobile sunroof, this invention should not be construed as being limited to that application. The invention is equally applicable to other vehicular or architectural uses, such as train, boat or airplane windows, skylights, architectural glass blocks, building windows, whether external or internal, and building wall panels.

The chromogenic panels of the present invention can be coupled with radiation sensors (i.e. visible and solar) and energy management systems to automatically control their transmissivity/reflectivity in order to optimize the use of lighting and electrical energy, as well as to maximize user comfort. In this regard, a computerized control system for buildings called TABS™ was recently announced by NET-MEDIA Inc. of Tucson, Ariz. This and other climate control systems for autos and buildings could be adapted for chromogenic panels.

The sensors associated with the present invention include light, temperature, and motion sensors, as well as any other convenient sensor or detector effective to measure any particular property, that the present invention is intended to respond to, for any particular application. Such light sensors include, for example, photodiodes, photoconductors, photoresistors, cameras, and arrays. Such temperature sensors include, for example, thermometers, thermopiles, thermoresistors, cameras, and arrays. Such motion sensors include, for example, infra-red (IR) and radio frequency (RF) detectors.

The sensors are mounted at any convenient effective location. Such locations include, for example, an exterior, interior, or intermediate surface; a point facing an exterior, interior, or intermediate surface; a portable or moving surface; on a handheld unit; a suspending point; and exposed or hidden points. The sensors can be included as part of a control assembly which can be conveniently plugged into a power outlet.

FIRST EMBODIMENT

Figure 2:
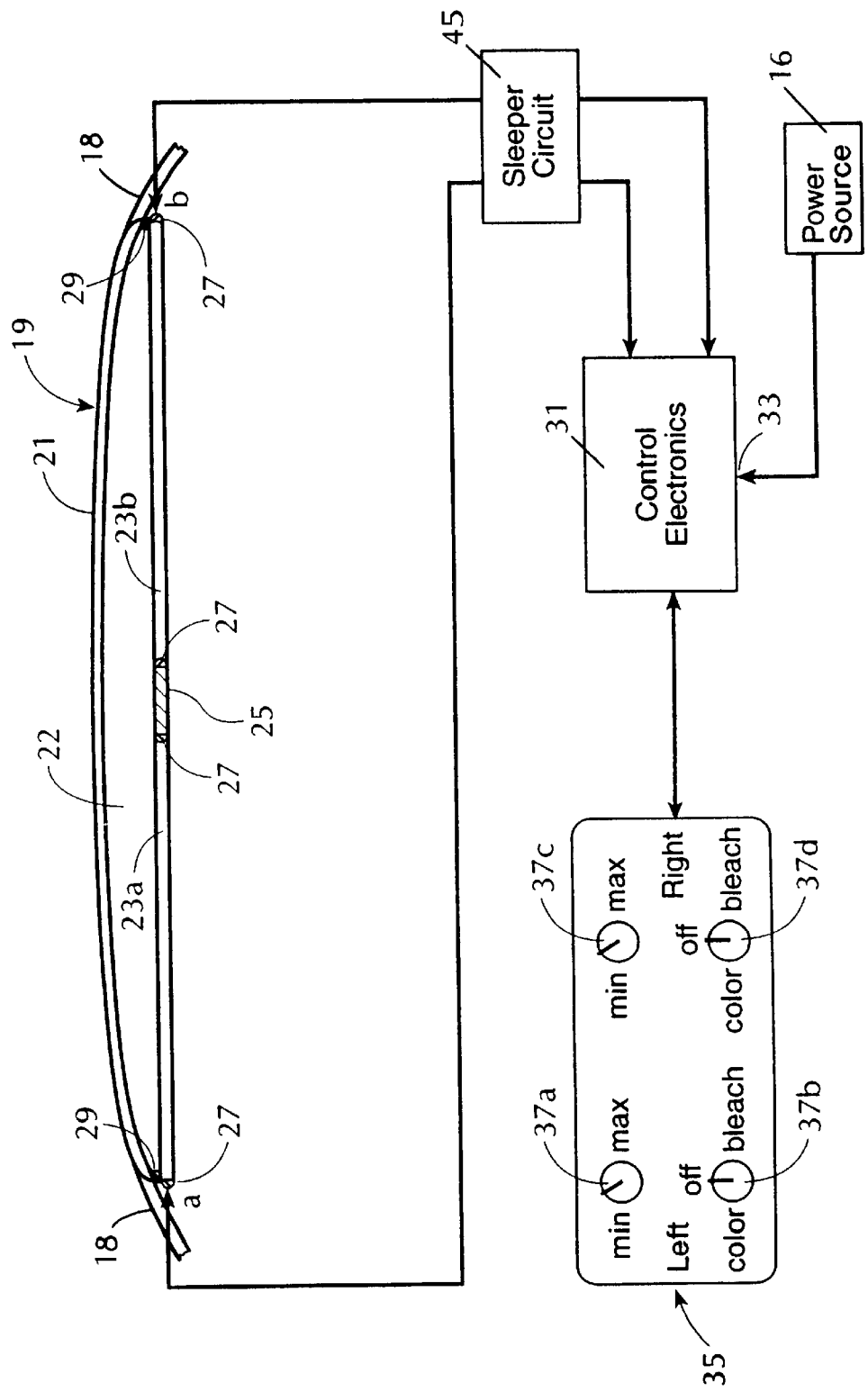
FIG. 2 is a schematic cross-sectional view of one embodiment of chromogenic window construction which could be used in a vehicle.

FIG. 2 depicts an embodiment of this invention suitable for use as an automobile sunroof. The sunroof 19 consists of a light-transmissive outer panel 21 which is curved to match the contour 18 of an auto's roofline. Since the original roof contour is preserved, vehicle appearance is enhanced and aerodynamics are maintained. Alternatively, a non-conforming roof profile could be used.

The transmissive outer panel 21 may be selectively tinted to completely or partly block ultraviolet, visible and/or infrared radiation. The outer panel may be made from glass of the type which is presently used for sunroofs. Glass of higher transmissivity can also be used in this invention to provide a wider transmission range for the user. Examples of such glasses are Solextra™ solar control glass and Sungate™ low-E glass, both from PPG (Pittsburgh, Pa.), Air Cool™ solar control glass from Airco and Sunglass HR™ from Ford Corporation, and low-E TECH™ anti-iridescent solar glass available from Libbey-Owens Ford of Toledo, Ohio. Of course, any other suitable type of glass could be used. Even non-glass materials, such as plastics, might be used.

Among the benefits of this particular construction is that the chromogenic sunroof is resistant to radiative heating and conductive heat transfer between the surrounding environment and the interior of the vehicle. Preferably, the sunroof consists of two spaced panels, mounted in a suitable frame or otherwise rigidly fixed in place. The space between the two panels provides a thermal break. This structure is especially useful because it provides a thermal break without the need to use more than two panels. Moreover, inert gas could be injected into the space between the panels, or the space may be evacuated to the extent practical to enhance thermal conductivity break characteristics.

As shown in FIG. 2, a sunroof assembly is composed of right and left panels 23a, 23b, disposed beneath and covered by a single outer protective panel 21. The right and left chromogenic panels may be independently powered and controlled through separate electronics. Controller box 35 has a number of knobs which independently control the coloring and bleaching of the right and left chromogenic panels. The chromogenic panels lie in a single, substantially horizontal plane, but of course this is not required. It is thought to be preferable to provide two chromogenic panels because this allows individual control of the nearest portion of the sunroof by both the passenger and the vehicle operator; of course a single chromogenic panel or several such panels could be used. A single chromogenic panel could be made to be partitioned electrically into two or more segments, and each segment can be controlled independently. This partitioning can be carried out by etching the transparent conduction coatings and electrochromic coatings that are used in making the chromogenic panels. Other panel arrangements, such as front and back, also could be employed.

The two chromogenic panels 23a, 23b are separated by a strip of interior roof material 25, which strip also can be seen in FIGS. 3, 6, 7, 9 and 10. The positioning of the chromogenic panels in this embodiment allows roof console accessories to be located in the strip 25 between the two panels 23a, 23b. Such roof console accessories may include the chromogenic panels and sunroof control systems, lights, storage bins, displays, indicators, speakers, sensors, intrusion detection systems, antennas (including cellular phone antennas and receivers, RF/IR vehicle entry antennas and receivers, and geographic positioning system (GPS) antennas and receivers), garage door openers, including trainable garage door openers, climate control ducts, mirror adapters, mirrors, etc.

Figure 3:
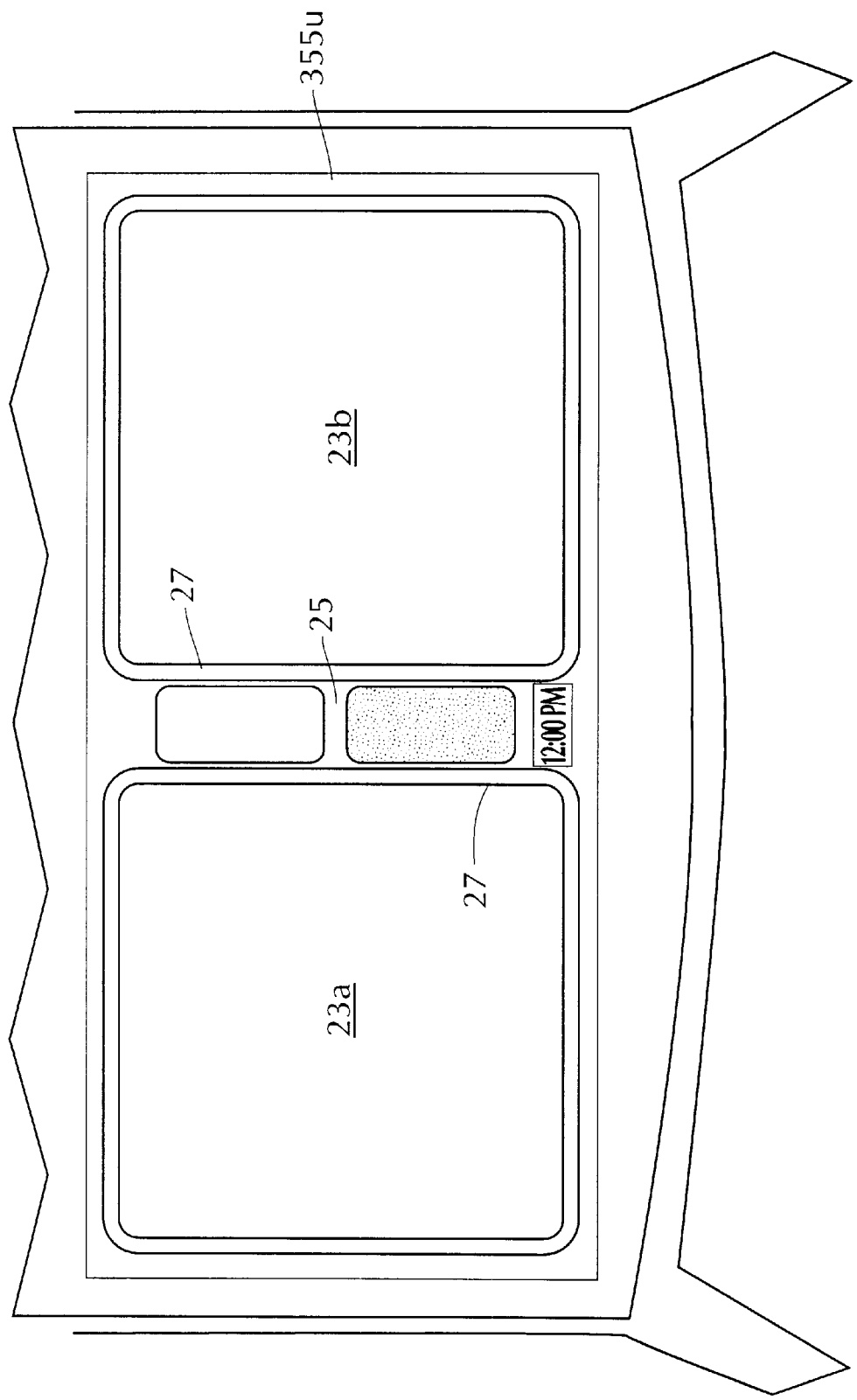
FIG. 3 is a bottom plan view of the interior portion of a vehicle roof employing the instant invention.

The arrangement shown in FIGS. 2 and 3 can optionally form a unitary configuration 355u, as shown in FIG. 3. Such a unitary configuration constitutes a unitary sunroof panel such that a conventional panel in a conventional sunroof can simply be removed and the unitary electrochromic glass sunroof assembly panel of this current invention can be substituted in its place.

This facilitates option offerings at an auto dealership. Such optional unitary configuration makes retrofitting of chromogenic panels to conventional sunroof installations a simple removal and replacement process without any need for bodywork. Thus, a unitary configuration provides a source of chromogenic panels for the aftermarket.

It is understood that another such optional configuration further includes the controls in a separate surface mountable unit. In such a configuration (not shown) the chromogenic panels are installed in the openings from which the conventional sunroofs were removed. The controls are then conveniently mounted on a surface and connected to the chromogenic panels. This optional configuration also facilitates installation of chromogenic panels as an option by the automobile dealer or other aftermarket installer.

The chromogenic panels 23a, 23b remarkably enhance the sunroof function, because they allow control of the amount and/or color of light passing through the outer panel of the sunroof 21. This enables vehicle occupants to adjust the amount of light entering to whatever they deem to be optimal, as well as to darken the sunroof whenever privacy or security is desired.

Both the chromogenic panels 23a, 23b and the outer panel 21 can be provided with coatings that improve sunroof performance and durability. For example, the coatings on the surface(s) of each panel may serve to block ultraviolet radiation (UV break), to reduce visible light reflection (antireflective), to reflect heat (heat mirror), to add color to incoming light (tinted), to increase surface hardness (scratch-resistant), to polarize incoming light, to confer low E-coating properties or to facilitate defrosting of the sunroof.

The control systems provide switches for regulating the bleaching and/or coloring of the panels, and preferably include knobs for adjusting bleaching levels and/or coloring, whether continuously or discretely, as discussed below.

Control of the chromogenic panels can be accomplished using the following components. As seen in FIG. 2, control electronics 31 are supplied with power from a power source 16 at power input 33. Controller 35 includes a number of control knobs 37a–37d which allow a user to adjust the properties of the chromogenic panels. Since controller 35 is shown regulating a sunroof having two chromogenic panels, knobs 37a and 37b are provided to control panel 23a, and knobs 37c and 37d are provided to control panel 23b. By adjusting knobs 37a and/or 37c, the color intensity of each panel can be varied from maximum to minimum. Likewise, by adjusting knobs 37b and/or 37d, the darkness of each panel can be varied from maximum to minimum, or any partial transmission level therebetween.

Controller 35 therefore outputs control signals to the control electronics 31 which cause the control electronics to apply power to the chromogenic panels in a manner which provides the desired appearance.

Figure 4:
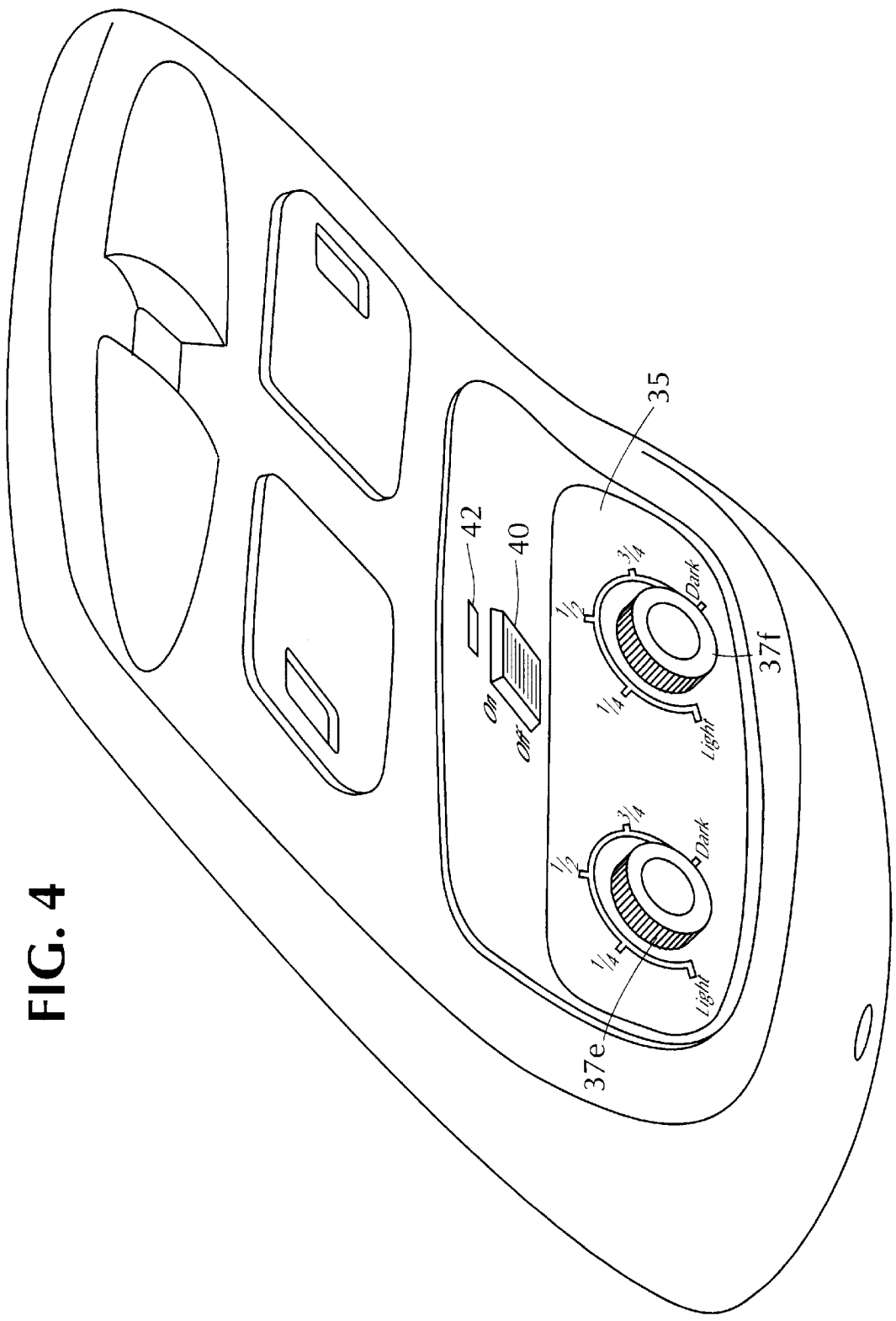
FIG. 4 is a perspective view of an embodiment of a control panel which could be used in the present invention.

A preferred embodiment of a controller suitable for automotive use is depicted in FIG. 4. Here, the controller 35 includes two control knobs 37e and 37f which correspond, respectively, to the two chromogenic panels in the sunroof. Such control knobs can be joined to potentiometers or other known control devices to regulate the bleaching and coloring of the individual panels. The controller 35 can also include an on-off switch 40, as well as an indicator light 42, which could be a light-emitting-diode (LED) to show when the chromogenic panels are operating. Of course this device is merely exemplary, and a wide range of controller shapes and layouts could be used. By properly designing the controller, each of the vehicle's sets of controls can be operated most easily by the person sitting under the corresponding chromogenic panel. This way, each control is preferentially accessible to a different occupant of the vehicle.

If two chromogenic panels are used, one being located on each side of the vehicle, the coloration of the chromogenic panels may be independently controlled using the aforementioned controller.

The components, mechanisms and techniques which can be employed to vary the color and darkness of chromogenic panels are themselves well-known. For example, it will be appreciated that the known art, including some of the art cited herein, teaches the use of an AC waveform to control LC and PDLC devices, as well as the use of a DC waveform to control EC and UCPC devices. If desired, the DC voltage can be ramped from zero to the selected voltage.

A further improvement to the control circuit for the chromogenic sunroof employs a sleeper circuit, as shown in FIG. 2. A sleeper circuit 45 helps reduce power consumption. More specifically, a sleeper circuit protects against power drain from the vehicle power system (typically, when the vehicle is parked, a 12 volt nominal battery) that is used to power the electrochromic sunroof when the vehicle is parked for a prolonged period. After a predetermined period, the sleeper circuit interrupts and ceases further power drain from the battery. This will prevent the chromogenic sunroof from depleting the vehicle's battery when the vehicle is parked and non-operating for prolonged periods. The predetermined time which must pass before current is interrupted can either be factory-selected or user-controllable. Preferably, the predetermined time is greater than twelve hours, and most preferably greater than twenty-four hours.

Figure 5A:
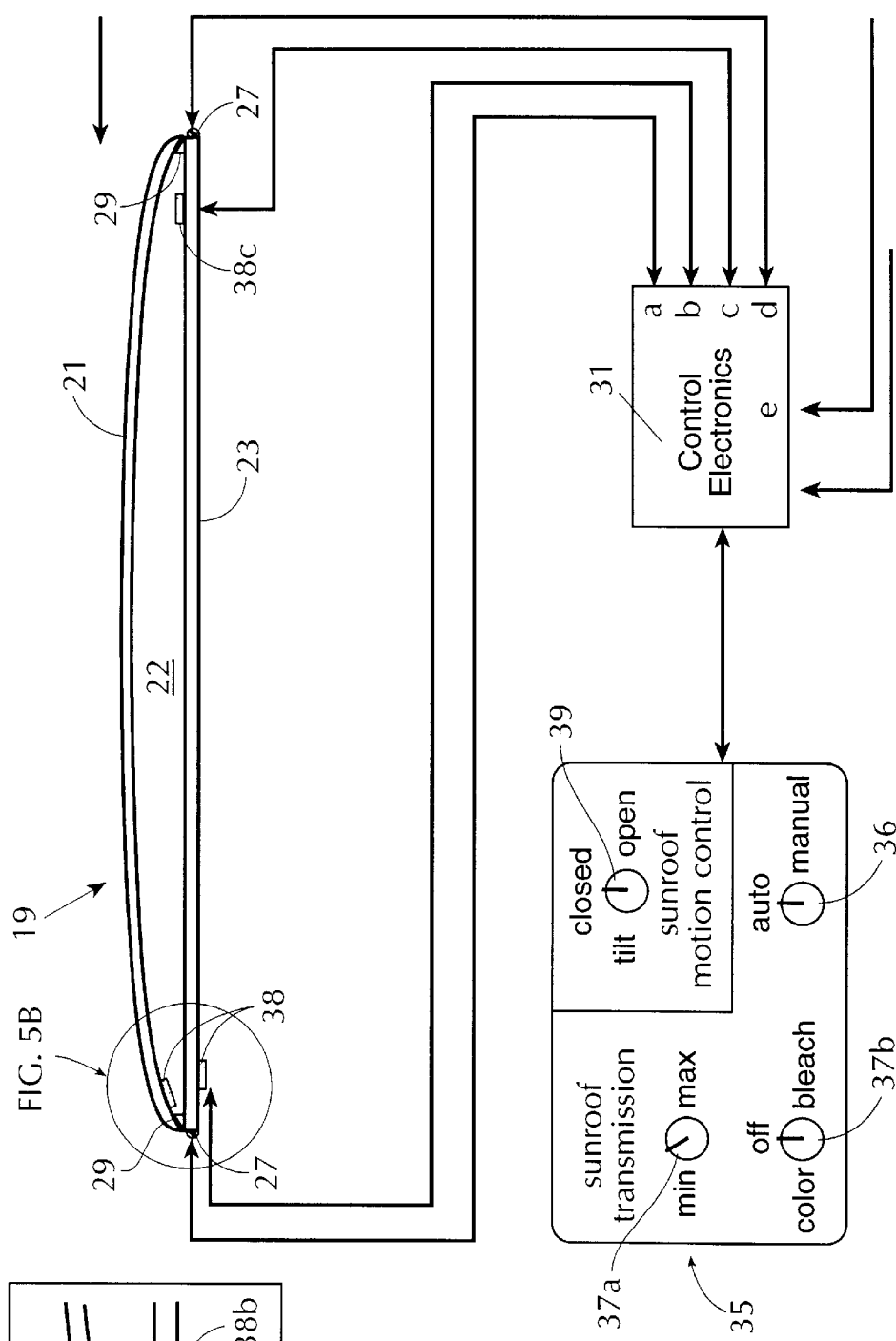
Figure 5B:
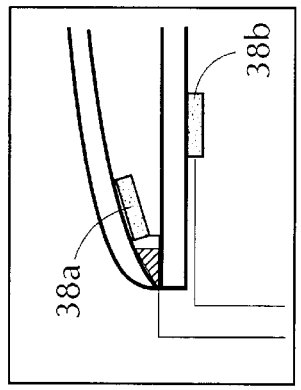
FIG. 5B is a close-up of a portion thereof.

A particularly preferred embodiment shown in FIGS. 5A and 5B enables automatic control of the chromogenic panel 23. The chromogenic sunroof assembly 19 is formed from a single chromogenic panel 23 which is covered by an outer protective panel 21. The sunroof is equipped with sensors 38 such as an outer panel photocell 38a which is positioned by the interior surface of the outer panel 21. A photocell 38b is located on the outer surface of the chromogenic panel 23, and a temperature sensor 38c is located on the inner surface of the chromogenic panel. This embodiment also includes electronic circuits such as a chromogenic panel control circuit and a sunroof movement control circuit, both of which may be part of a controller 35. The controller 35 may include control knobs 37a,b for adjusting the sunroof transmission properties, a knob 36 for automatic or manual setting, and the sunroof motion control knob 39 (other control arrangements are also possible, such as slider switches, touch sensitive controls, or microprocessor-operated controls). Alternatively, photocell 38b may be located in the interior of the automobile so as to provide input to the control system for the purpose of regulating the desired ambient lighting in the vehicle. The sensor may even be a remote type of unit which can be placed by an operator at any desired location.

The control system for controlling the chromogenic sunroof can even employ other sensors in the vehicle. For example, many vehicles today have auto-dimming mirrors which may be electrochromic. These electrochromic mirrors may be controlled by photosensors found in the mirror housing or other location in the vehicle. Output corresponding to the ambient lighting, from such photosensors, also can be used to control the solar radiation transmission through the sunroof.

As shown in FIGS. 5A and 5B, temperature sensor 38c and/or photocells 38a, 38b, as well as possibly the automobile's own climate control systems, can be used to provide the control electronics 31 with information regarding conditions both inside and outside the vehicle, thereby allowing automatic control of the chromogenic panel (of course, not all of these devices or signals need be used). Such conditions could include light levels and temperatures. The control electronics can vary the transmissive properties of the chromogenic panels as necessary, for example, by using stored data and/or mathematical algorithms. Of course, a user-controlled override system such as knob 36 also could be provided.

The voltage and other driving conditions of the chromogenic panels may be adjusted in response to ambient and/or vehicle temperature. For example, one or more thermocouples could be positioned in any appropriate location, such as inside the car, outside the car, between the outer and chromogenic panel(s), on the inner surface of the chromogenic panel(s), on the outer surface of the chromogenic panel(s), or anywhere else in the sunroof assembly. Signals from the sensors would be analyzed by the control electronics 31 to regulate the chromogenic panel's transmissive properties to vary the temperature or internal light quality as needed.

The chromogenic panel(s) can be powered by the car battery, car generator or even auxiliary power sources such as solar cells, rechargeable batteries and Peltier or Thompson effect devices. Such power sources, e.g. a solar cell, may be an integral part of the sunroof assembly if desired.

An even more detailed explanation of a system for controlling a chromogenic sunroof will now be provided. Other suitable systems could be used to control this sunroof, in accordance with the principles of construction and operation previously set forth.

Figure 14:
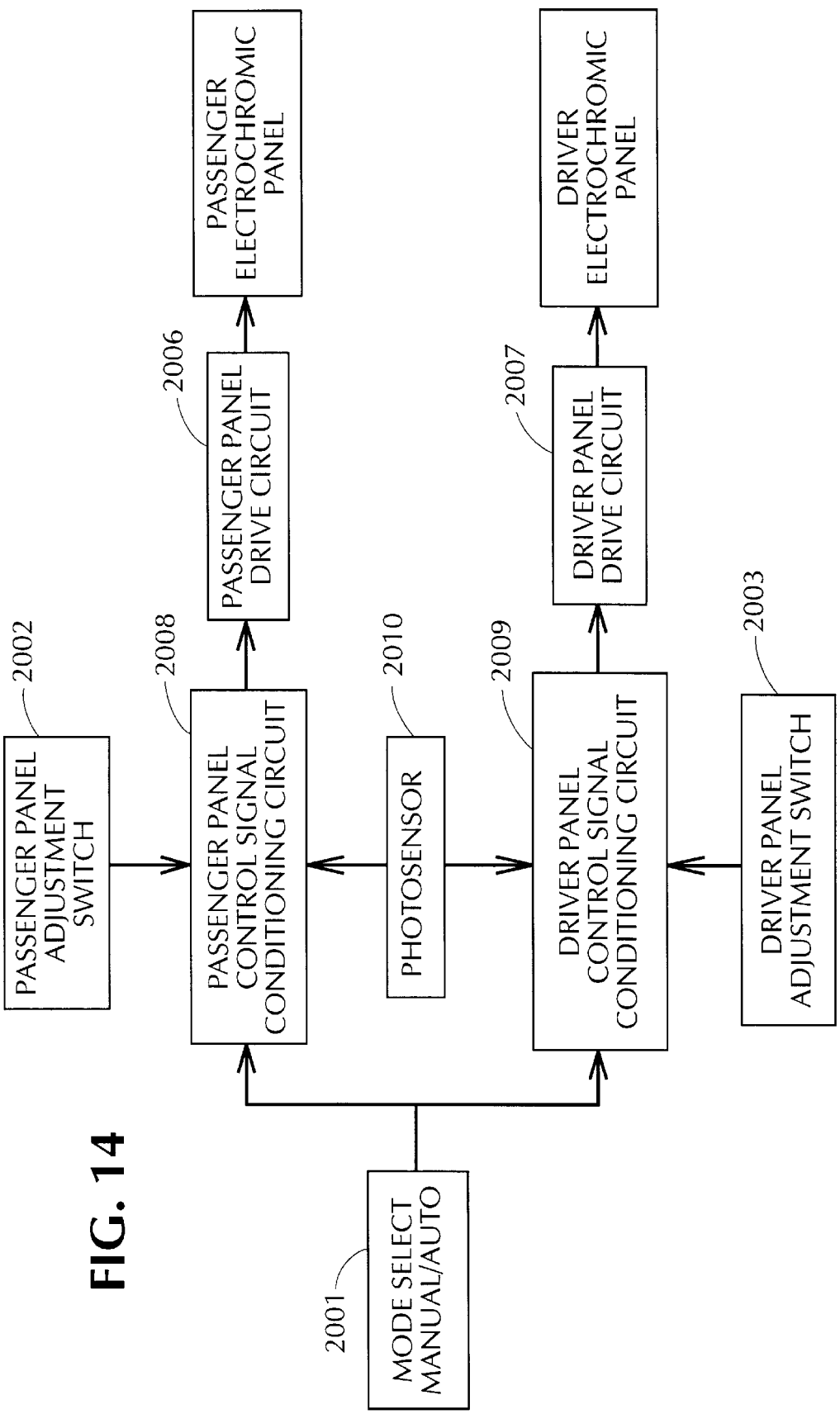
FIG. 14 is a block diagram showing the construction of a system for controlling an electrochromic sunroof having both driver and passenger panels.
Figure 15A:
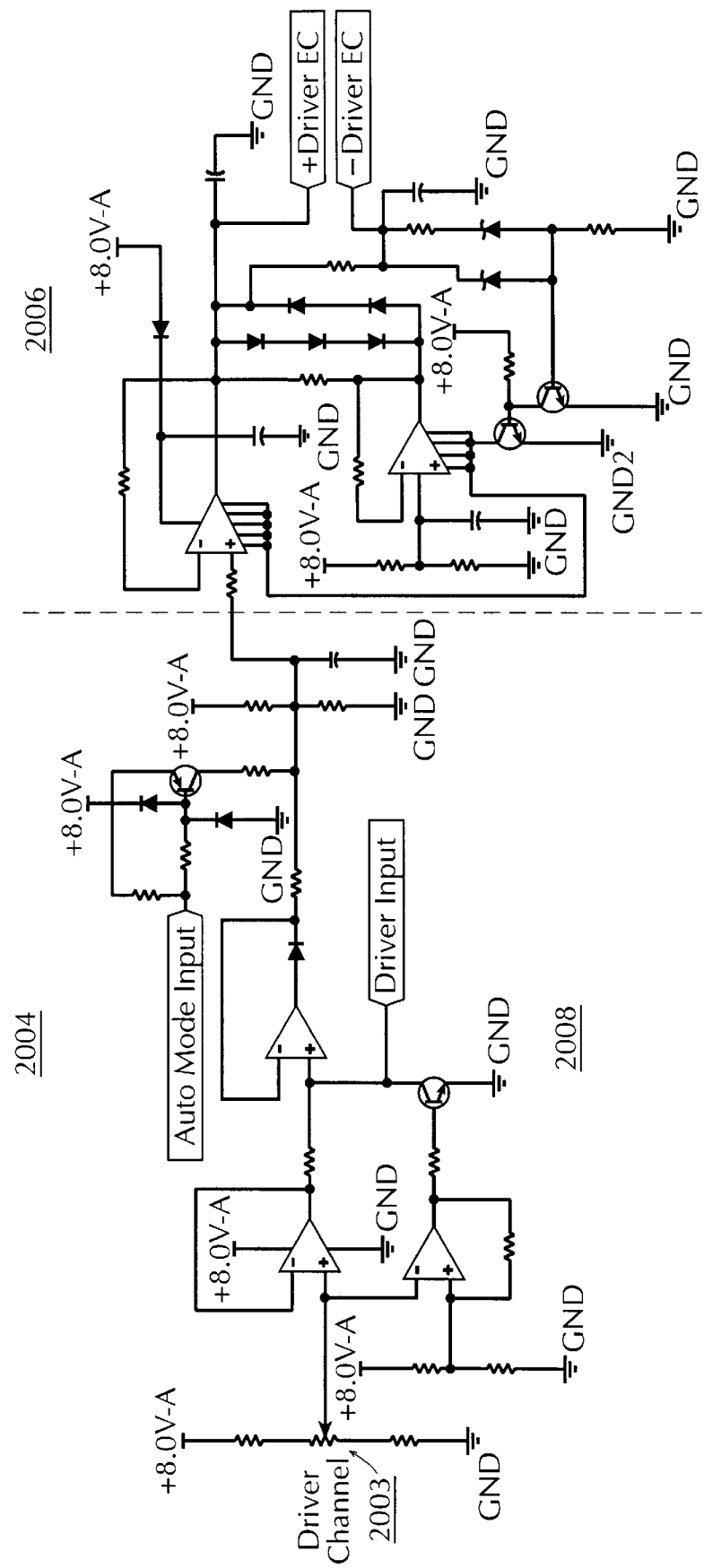
FIGS. 15A and 15B are schematic circuitry diagrams showing the implementation of the control system of FIG. 14.
Figure 15B:
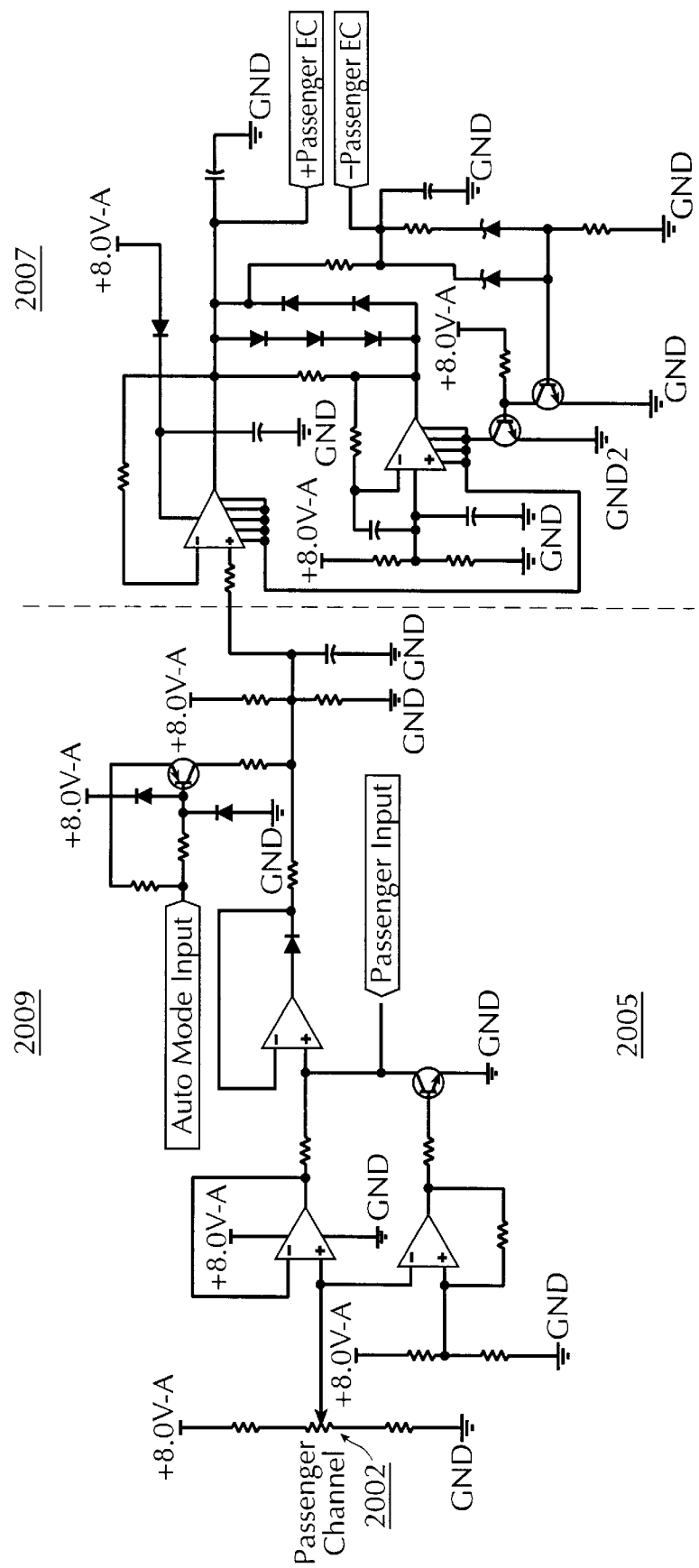
Figure 16B:
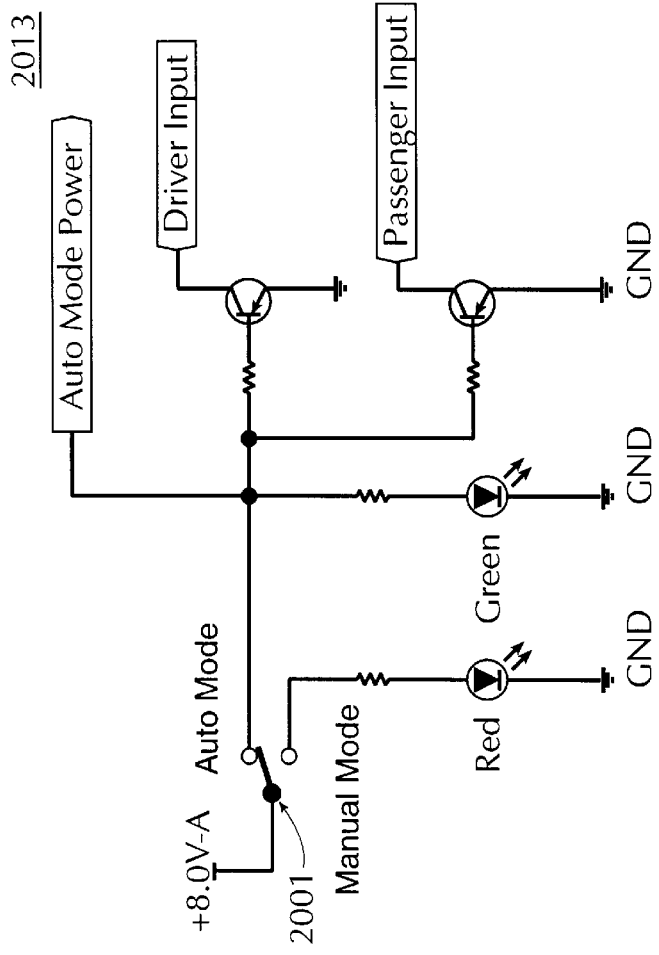
FIG. 16B is a schematic circuitry diagram of a mode selector circuit.
Figure 16A:
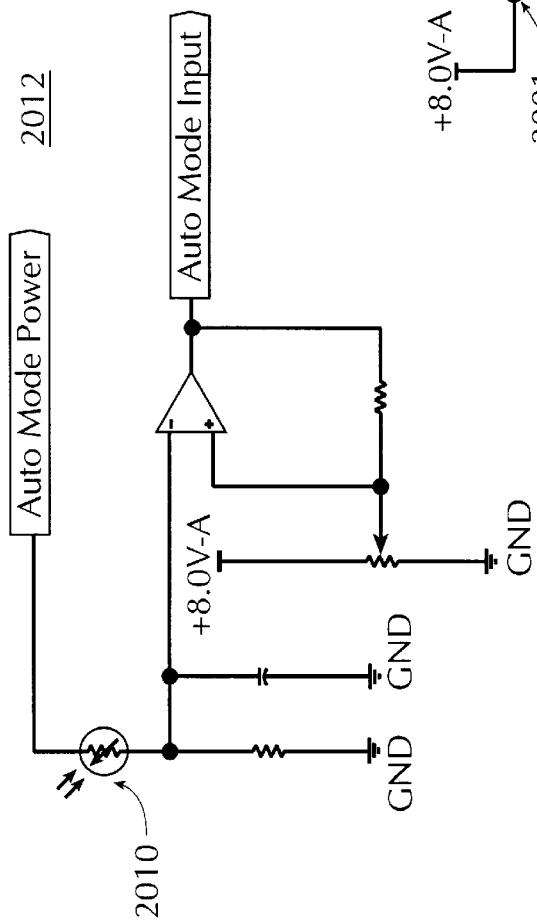
FIG. 16A is a schematic circuitry diagram of a photosensor filtering circuit.
Figure 16C:
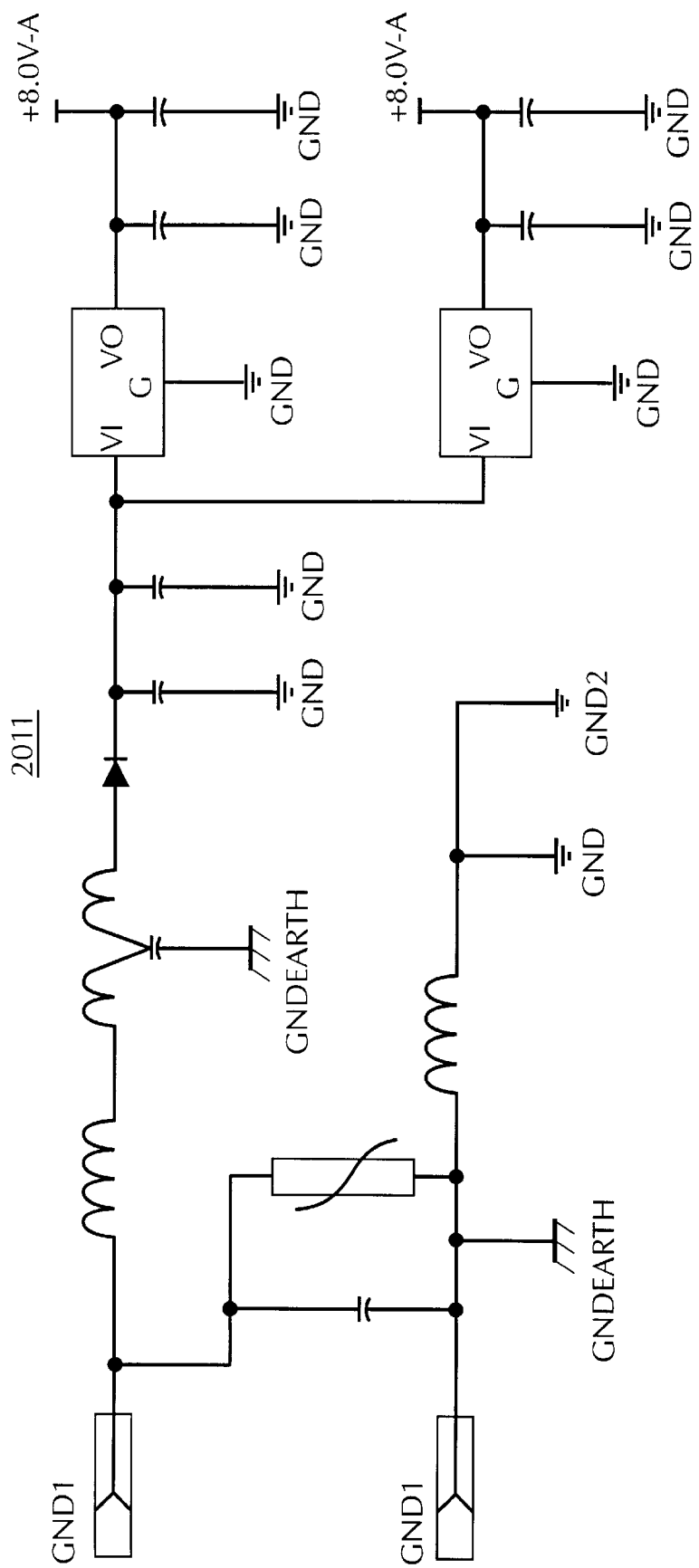
FIG. 16C is a schematic circuitry diagram of a power conditioning circuit.

The control circuitry depicted in FIGS. 14, 15A and 15B provides the vehicle operator with a choice of having either manual or automatic control of the transmissivity (color) of two electrochromic sunroof panels. This circuitry is based upon known electronic systems which can analyze the lighting environment of an automobile in order to control electrochromic mirrors.

FIGS. 15A, 15B and 16A–C depict a control system suitable for use in the instant invention. In developing this system, the teachings of U.S. Pat. No. 5,424,898 (Larson et al.), entitled "Fault Tolerant Drive Circuit for Electrochromic Mirror Systems" have been considered, and that patent is incorporated by reference herein.

The circuits in FIGS. 15A and 15B utilize two independent channels of control circuitry (driver 2004 and passenger 2005) which begin at the operator interface and continue independently through the circuitry to the driver and passenger electrochromic panels. Driver channel 2004 and passenger channel 2005 are both supplied with electrical power from power conditioning circuit 2011, showing in detail in FIG. 16C, which converts the unregulated automotive ignition supply into filtered and regulated 8 volt supplies. Driver channel 2004 and passenger channel 2005 also share connections to mode selector circuit 2013, shown in detail in FIG. 16B, and photosensor filtering circuit 2012, shown in detail in FIG. 16A. The vehicle operator interface consists of mode selector switch 2001, a driver panel adjustment switch 2003 and passenger panel adjustment switch 2002. Mode selector switch 2001 allows the vehicle operator to select either the automatic or manual mode of operation. The driver and passenger panel adjustment switches 2003 and 2002 are three-quarter turn potentiometers which allow the vehicle operator to select independently the transmissivity or coloring levels of the driver's and passenger's electrochromic panels. Panel adjustment switches 2003 and 2002 allow infinite adjustment of the electrochromic panels between their fully-colored and fully-bleached states of transmissivity.

By selecting the manual mode of operation using mode selector switch 2001, the vehicle operator is able to alter independently transmissivity characteristics of the driver's and passenger's panels by way of adjustments made to adjustment switches 2002 and 2003. Once a panel's desired transmissivity level has reached its setpoint the panel will remain in this state until either power is removed from the circuit or the adjustment switch is changed.

In the automatic mode of operation, photosensor 2010 and associated filtering circuitry 2012 generate an electrical signal indicative of the lighting environment in which the vehicle is present.

Photosensor 2010 is a photoconductive element (photoresistor) which has a spectral response which approximates the spectral sensitivity of the human eye. The photosensor electrical signal is supplied to signal conditioning circuitry 2008 and 2009, which independently process the photosensor electrical signal to convert it for use by drive circuits 2006 and 2007. Passenger panel drive circuit 2006 and the driver panel drive circuit 2007 convert electrical signals generated by signal conditioning circuits 2008 and 2009 into voltages and currents capable of directly powering electrochromic panels. In this particular implementation of the automatic mode the photosensor circuit 2012 generates a binary signal which causes the electrochromic panel to be supplied with either a fully-bleached or fully-colored electrical signal. Filter circuit 2012 processes the electrical signal supplied from photosensor 2010 to generate a signal which has improved stability in dynamic lighting conditions such as those which are typically encountered in normal driving environments. A simple RC type of filtering technique is used in filtering circuit 2012. The relatively slow response time of the electrochromic panel is utilized to the system's advantage in order to allow the fluctuating binary control signals generated by drive circuits 2006 and 2007 to be integrated by the electrochromic panel, creating an intermediate transmissivity state between fully-colored and fully-bleached. Dynamic lighting conditions such as those encountered on partially shaded roads and sparsely clouded skies result in intermediate transmissivity states in the electrochromic panels, thereby emulating the performance of much more complicated and costly circuitry. Further, momentary application of voltage and duty cycling as disclosed in U.S. Pat. No. 5,220,317 and U.S. Pat. No. 5,384,578 can be utilized to intermittently apply coloration voltage to the chromogenic panels and thereby further reduce drain on the vehicle power system by utilizing any prolonged coloration (memory) capability of the panel. Photocells (solar cells) may also be integrated in the assembly to keep the sunroof dark without draining the battery.

Further refinements can be made to enhance the properties of this sunroof. For example, the volume 22 between the chromogenic panels 23a, 23b and the outer panel 21 can be sealed or, alternatively, that volume can be vented into the interior of the vehicle. It is also possible to air-condition that volume 22 using forced air. It will be appreciated that each approach offers specific benefits—for example, a sealed volume may provide superior insulation, and help to reduce rattling and reduce infiltration of outside noise. A vented or air-conditioned volume may be less prone to fogging.

The volume 22 enclosed by the outer panel 21 and chromogenic panel 23 can be isolated by using suitable gasketing material 27 or other enclosure techniques to seal any gaps between the various components of the sunroof assembly. Gasket 27, as shown in FIGS. 2 and 3, surrounds the chromogenic panel. A similar gasket 29 serves as a seal between the edge of the outer panel and the outer edge of the chromogenic panel. Alternatively, the volume 22 enclosed by the panels could be filled with any desired gas mixture.

The chromogenic panels 23a, 23b and/or the outer panel 21 can have at least one layer of material 17a and/or 17b disposed thereon or there between which changes either an optical property or a physical property of the window assembly 19. Such optical properties include the panel's ability to transmit (especially to reduce) solar radiation, to transmit (especially to reduce) ultraviolet radiation, to transmit (especially to reduce) visible light, to reduce reflection (an antireflective), to add color to the incoming light (tinting), or to polarize the incoming light. The physical properties include the panel's ability to reflect heat, its surface hardness, and its E-coating properties, (such as a low-emissivity or low-E coating which serves to reduce the transmission of infrared radiation through the glass).

More specifically, the sunroof design can include an ultraviolet radiation break, either in the form of a third member which blocks such radiation, or by making one of the sunroof panels, preferably the outer panel, from UV blocking material. This can be done, for example, by selecting as a third member a material which inherently blocks or absorbs UV radiation, or by "doping" a material so that it will block or absorb that radiation. Alternatively, the third member could be coated with UV blocking or absorbing material, preferably on its outer side.

Examples of solar efficient glass, including glass with reduced transmissivity to ultraviolet radiation, are found in U.S. Pat. No. 5,239,406 (Lynam) and U.S. Pat. No. 5,073,012 (Lynam).

It will be appreciated that the combination of thermal and ultraviolet breaks make this sunroof construction highly attractive indeed.

If the unit is sealed, the inner surface of the protective panel and the surface of the chromogenic panel(s) facing the panel may not need to be made scratch-resistant, since those surfaces are enclosed and protected from inadvertent contact.

The outer and chromogenic panels may be tempered, laminated or otherwise treated to make them more suitable for vehicular use. For example, the protective outer panel 21 may be tempered, while the chromogenic panel(s) 23 may be tempered and/or laminated onto a tougher, more durable or otherwise preferred material (not shown).

To improve vehicle safety, the surface of the chromogenic panel(s) facing the interior of the vehicle, and/or the surface of the chromogenic panels facing the protective outer panel can be contacted with a layer or multilayer of polymer such as a plastic material. Examples of such materials are recited in U.S. Pat. No. 5,239,406 (Lynam), previously discussed, and include a polyester/polyvinylbutyral composite layer and a reticulated polyurethane.

One example of such polyurethane is SECURIFLEX® material, manufactured by Saint-Gobain Vitrage. Another example is SPALLSHIELD®, a polyester sheet that has a hard coat (for scratch resistance) on one side and PVB (poly vinylbutyral) on the other manufactured by Dupont of Wilmington, Del., with the PVB laminated onto the glass.

Still another example is LEXAN®HP12W and HP92W, a polycarbonate sheet made by General Electric Plastics Structures Products of Pittsfield, Mass. This can be laminated onto the glass or it can be inserted between the chromogenic panels and the outer panel.

Accordingly, should the sunroof break, the SECURIFLEX® or the SPALLSHIELD® layer, or the LEXAN® layer or insert will prevent pieces of glass from shattering into the vehicle's interior (and will also prevent leakage of material from the chromogenic, i.e. electrochromic, medium into the vehicle interior). When such layers are placed on the surface of the chromogenic panel facing the protective outer panel, they can fulfill the dual beneficial role of providing safety protection and ultraviolet radiation reduction protection for the chromogenic medium. These materials may be incorporated onto the substrate before assembling the EC panels or they may be incorporated after assembling the EC panels. Standard lamination procedures such as autoclave which uses elevated pressure and temperature, a standard lamination autoclave process, could be used to incorporate these materials.

Transparent or thin linear resistors can be formed in the chromogenic panels to heat or defrost the sunroof. For example, transparent conductive glass such as indium tin oxide (ITO) coated glass or fluorine-doped tine oxide undercoated with a anti-iridescent means commercially-available as TEC™ glass from Libbey-Owens-Ford, preferably with a sheet resistance of 20 ohms/square or less, can be used on the inner facing surface of the outer protective panel and/or on the chromogenic panel. Examples of the use of ITO coated glass and anti-iridescent fluorine doped tin oxide glass are disclosed in U.S. Pat. No. 5,424,865 (Lynam) entitled "Electrochemichromic Solutions, Processes for Preparing and Using the Same, and Devices Manufactured with the Same", the disclosure of which is incorporated by reference herein.

Power can be forwarded to chosen chromogenic panel(s) in all sunroof positions.

Figure 7:
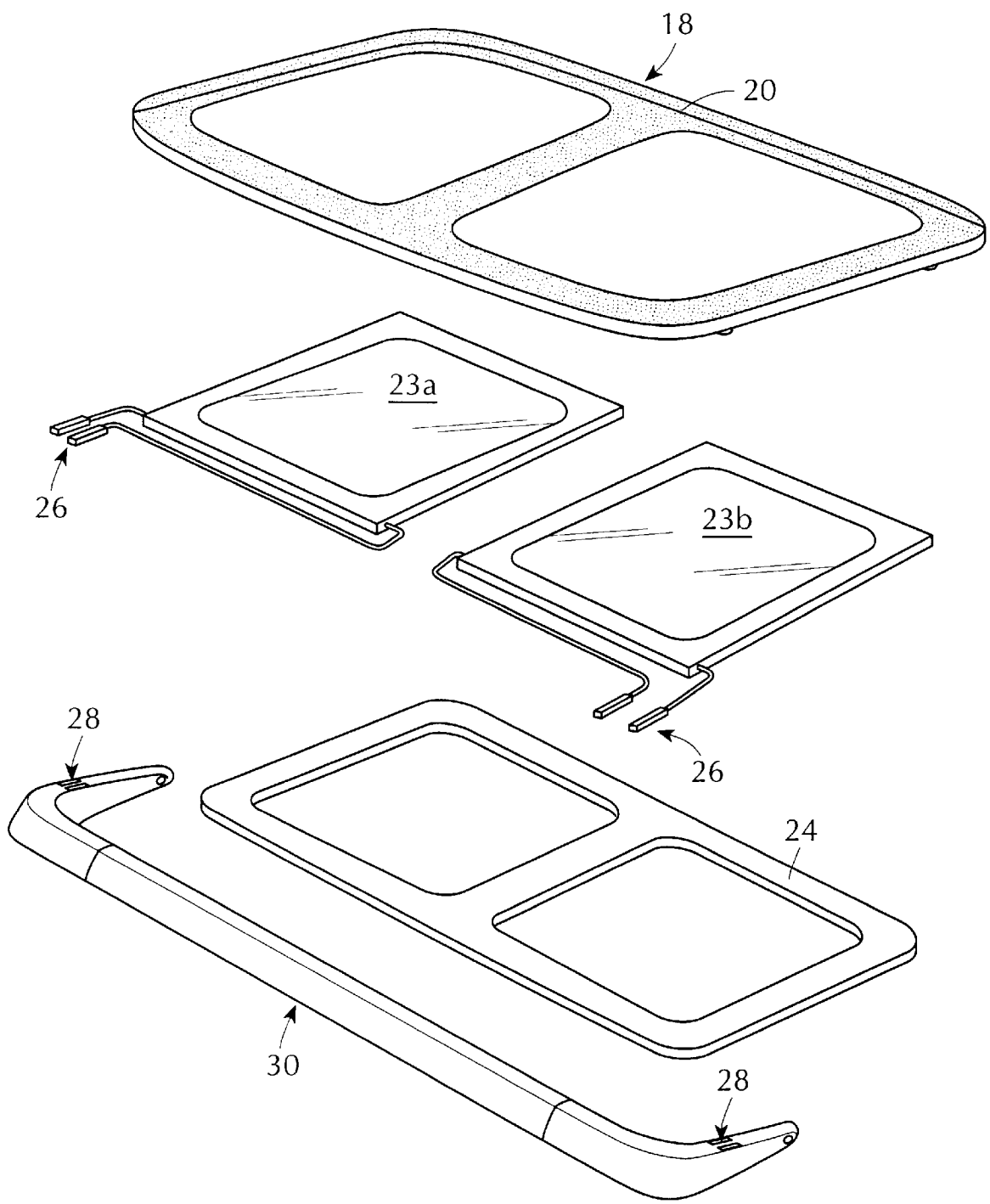
FIG. 7 is an exploded perspective view of an automobile sunroof employing the present invention.

Alternatively, the sunroof may only be powered in the closed position. Such a sunroof is shown in FIG. 6, which depicts an automobile interior looking in from beside the driver's door, and which shows the sunroof 19, along with a control console 35. FIG. 7 illustrates panels assembled to provide a sunroof somewhat similar to that shown in FIG. 2. The outer panel 21 may be a conventional sunroof panel to which the chromogenic panels 23a, 23b are bonded. Frit or paint 20 can be used to hide the edges, connectors and other thin components which are included in the sunroof assembly. Typically, the frit or paint 20 is provided on the inner surface of the outer panel 21, but the frit or paint could be applied elsewhere, or even in multiple locations and/or layers.

As shown in FIG. 7, the chromogenic, preferably electrochromic, panels 23a, 23b are bonded to at least part of the inside of the sunroof glass 18. Trim bezel 24 is further bonded to at least part of the panels to provide an interior appearance which conforms to the other trim components in the passenger compartment. The power leads 26 are also bonded onto the outer panel 21 in the manner shown in FIGS. 8A and 8B. In the closed position, these bonded contacts come into contact with the electrical contacts 28 which are held stationary upon the wind deflector 30. The contacts 28 on the wind deflector 30 can be wired to the circuitry of the control console 35 shown in FIG. 6.

Figure 8A:
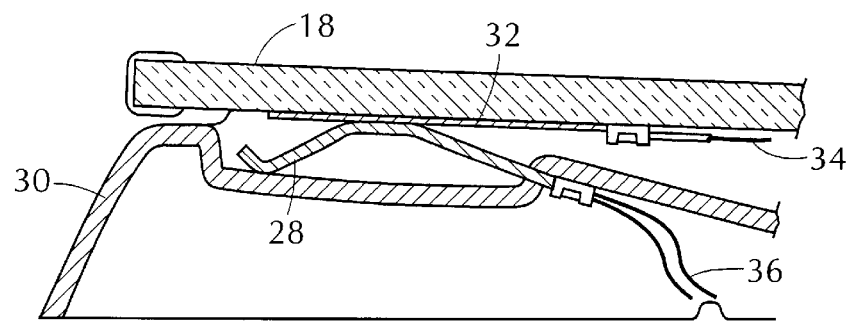
Figure 8B:
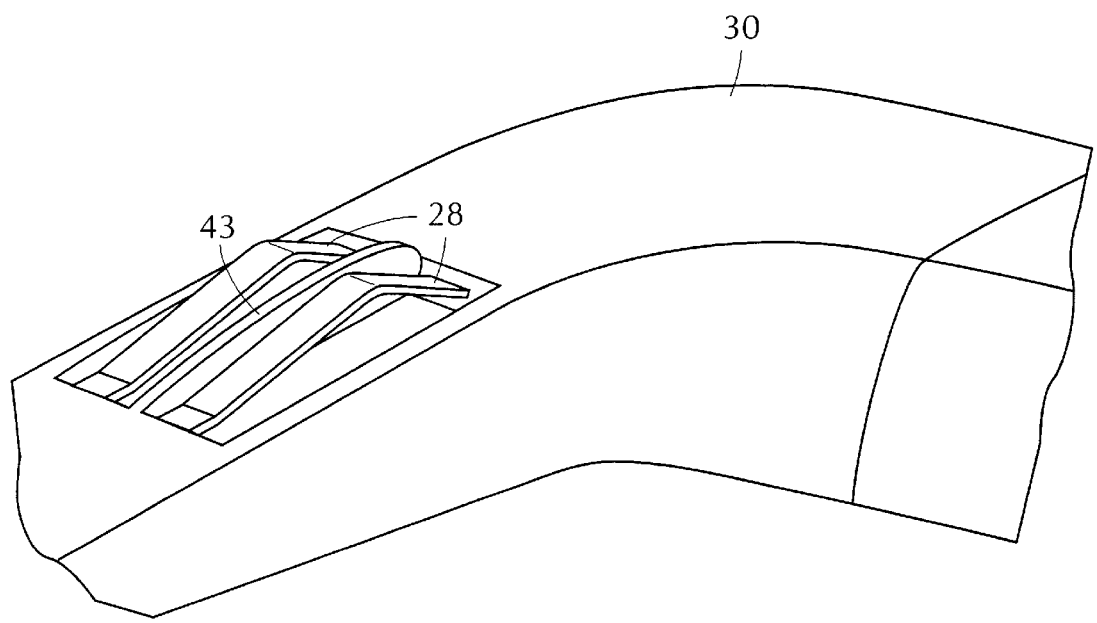
FIG. 8B is a perspective view of the top of the connector system shown in FIG. 8A.

Details of the contacts are shown in FIGS. 8A and 8B. As depicted, it is preferable to use spring-loaded contacts 28 to avoid rattling, and to ensure that there is good electrical contact between components even when driving. The contact mechanism consists of electrical contacts 32 which are bonded to the sunroof glass 18, these bonded contacts 32 being connected to wiring 34 which leads to the chromogenic panels (not shown). Other wiring 36 is connected to the controller (not shown).

The contact structure shown in FIGS. 8A and 8B is thought to be particularly beneficial for automotive use. Connection of the driving circuit takes place when the sunroof glass 18 rides over the wind deflector 30 during closure. The bonded contacts 32 on the moving glass 18 wipe the other contacts 28, thereby keeping all of the touching surfaces clean, and so ensure that good electrical contact is made. Rib 43 serves to separate the wires 36.

A further benefit of this construction is that it disconnects the chromogenic panels from the controller whenever the sunroof is open, reducing power consumption and helping to prolong the life of the chromogenic panels. When the sunroof is closed, however, and the sunroof glass is in the forward position where it abuts the air deflector, the circuits are completed and the overhead controller can control the transmissivity of the chromogenic panels. Thus, this construction could be referred to as a signal applying means for causing the contacts of the sunroof to be electrically connected to a circuit which supplies the applied signal when the sunroof is closed, and not when the sunroof is open.

Figure 9:
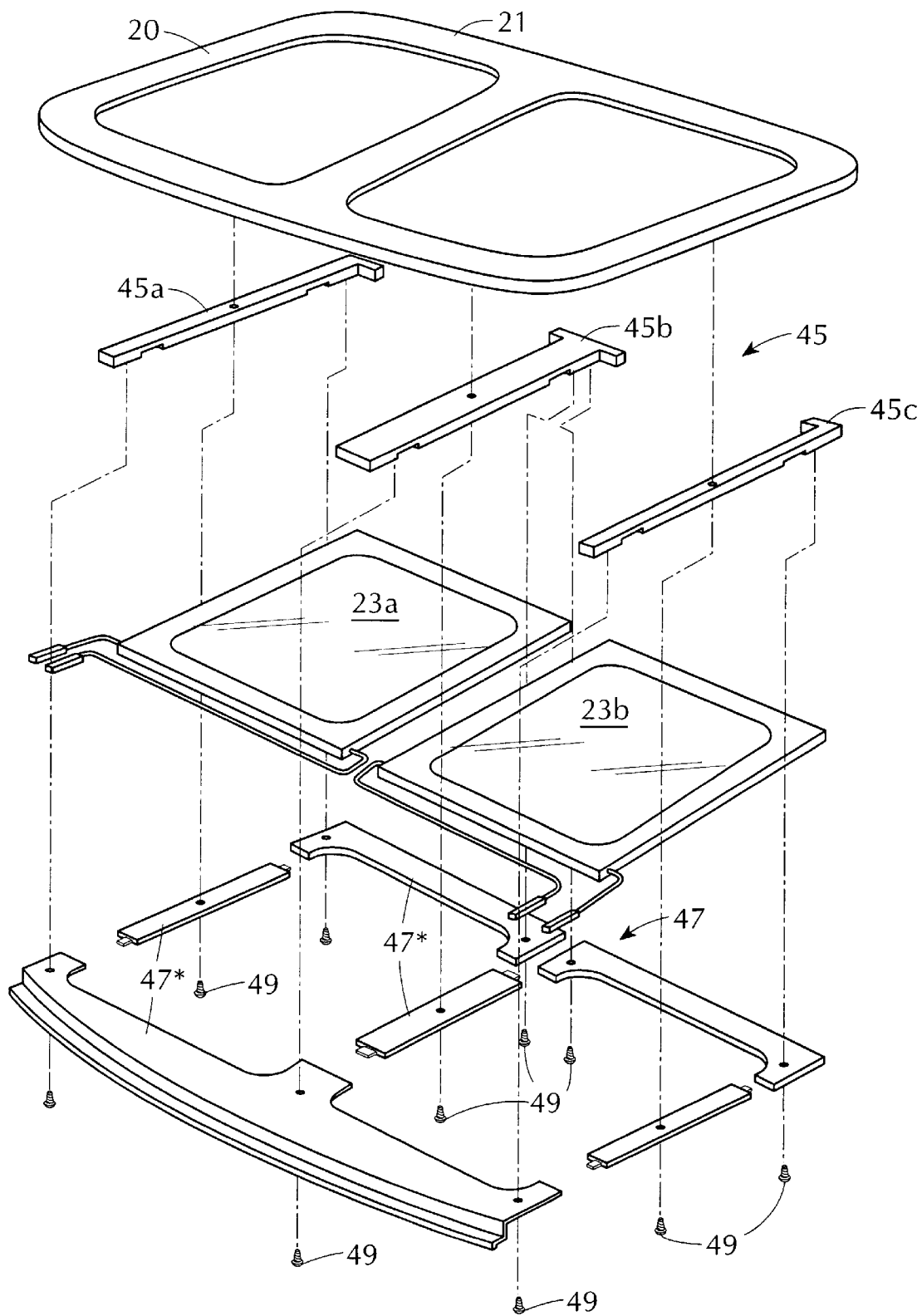
FIG. 9 is an exploded perspective view of an automobile sunroof employing another embodiment of the present invention.

Another way to attach the chromogenic panels to the sunroof is shown in FIG. 9. In this embodiment, the chromogenic panels 23a, 23b are not directly bonded to the outer panel 21. Rather, an upper frame 45 consisting of three rails (right 45a, center 45b and left 45c rails) is bonded to the panel 21. The central rail 45b (and even the other rails 45a, 45c) may be painted and shaped so that no paint or frit is required on the center (or edges) of the outer panel 21. A lower frame 47 made up of various trim members 47* (alternatively, a unitary frame could be used) is mounted onto the upper frame 45 using screws 49, although it will be appreciated that any other suitable fasteners, such as bolts or adhesive, could be used instead. The chromogenic panels 23a, 23b can be slipped into the cavity (not depicted) formed by the two frames 45 and 47. This way, the EC panels 23a, 23b can be serviced individually, if required.

As shown in FIGS. 7 and 9, the perimeter of the outer surface of the outer panel 21 may contain a layer of frit or an opaque border 20 which serves to hide any electrical connections between the vehicle electronics and the chromogenic panel, and also may include an encapsulant (i.e, gasketing, not shown). Any desired border color could be used.

The shape of the chromogenic panel(s) may conform to the outer panel curvature or may be different. For example, the outer panel may be curved while the chromogenic panel(s) may be flat, a configuration thought to enhance chromogenic panel performance, while also simplifying production and reducing the costs of fabrication.

Figure 10:
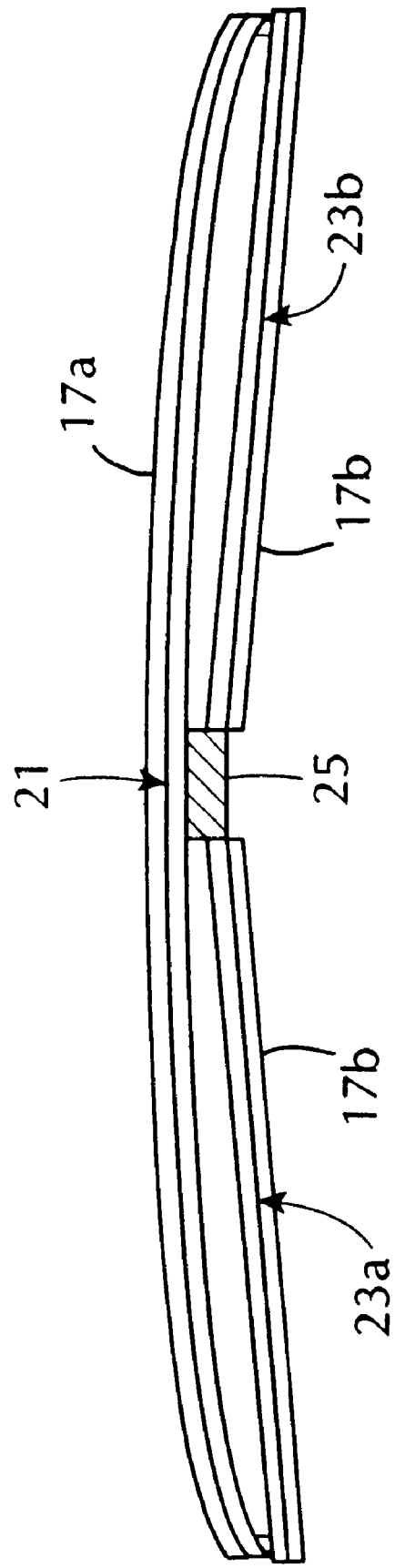
FIG. 10 is a side cross-sectional view of a sunroof design according to the instant invention.

The chromogenic panels 23a, 23b do not have to be in the same plane or even parallel to the outer panel 21. In some cases, a non-parallel approach may be preferred in order to reduce the reflections from the various surfaces of the outer and the chromogenic panels. An arrangement of this type is shown in FIG. 10.

At least one of the busbars (not shown) and the transparent conductor (not shown) of the chromogenic panel(s) may be used as an antenna, such as an RF antenna for security systems, entry systems, car positioning systems (i.e. GPS), communication systems, or for remotely activating the chromogenic panel(s).

The sunroof mechanism will ordinarily include a circumferential supporting trough providing a frame for attachment to the strut assembly.

The vehicle may be equipped with rain sensors so as to mechanically close the sunroof even in parked conditions when rain is detected.

EXAMPLE

An aftermarket-installed non-chromogenic sunroof assembly in a Honda automobile was modified to incorporate a chromogenic member consisting of twin flat electrochromic panels while maintaining the conformity of the chromogenic sunroof assembly of this example to the surface contour of the roof of the Honda automobile (a Honda Prelude). First, the metal frame of the aftermarket-installed sunroof assembly was removed from the curved glass panel thereof. This curved glass panel, that was tempered, tinted, and solar efficient constitutes the outer panel of the chromogenic window panel assembly of this example. This outer panel is a single, contiguous glass panel that, when installed in a vehicle, is located closer to the source of solar radiation, i.e., the sun, than the chromogenic member. Thus, when utilized in a vehicle, the outer panel protects the inner chromogenic member from the effects of incoming radiation, e.g., UV, visible and IR radiation. Next, since the flat electrochromic panels (fabricated using the construction and teachings of U.S. patent application No. 60/015,223, entitled "Electrochromic Devices", and already incorporated by reference) were $\frac{3}{8}$th of an inch thick, both the sunroof track assembly and the headliner were lowered by a distance equivalent to $\frac{3}{8}$th of an inch. Two electrochromic panels were then slid beneath the original non-chromogenic sunroof glass panel that serves as the outer glass panel. Since the outer glass panel has a compound curvature, the two flat electrochromic panels fit close to the glass in a shallow "V" shape, but with an air-filled thermal break therebetween. The outer sunroof panel was 32" by 14½" in size, and the individual flat electrochromic panels, including encapsulant, were each 14½" by 16" in size. This method of installation allowed retention of the sliding panel located beneath the sunroof. A chromogenic sunroof assembly of general construction of this example was successfully installed in a vehicle and displayed the performance required to be suitable for use in a vehicle.

The above chromogenic configurations can also be used in skylights for buildings, or in other automotive (such as a chromogenic T-top or moonroof), vehicular and architectural applications.

SECOND EMBODIMENT

Figure 12:
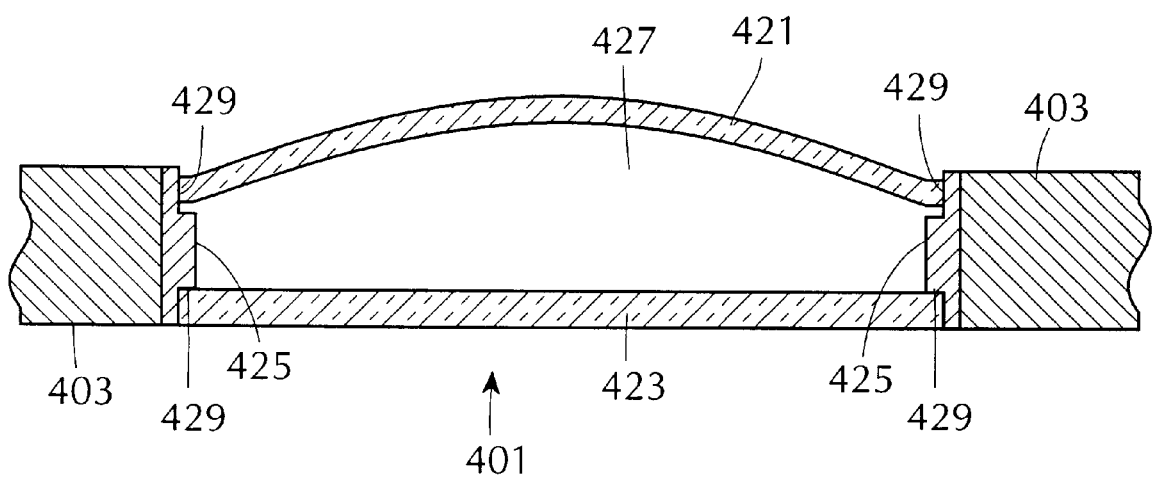
FIG. 12 is a schematic cross-sectional view of a chromogenic skylight window construction suitable for architectural use.

FIG. 12 depicts still another embodiment of this invention. That embodiment is a skylight 401 suitable for architectural use. Here, a curved outer panel 421 and flat chromogenic panel 423 are held by frame 425 with a volume of air 427 therebetween. Frame 425 is itself attached to a roof or ceiling member 403. The volume 427 may be either vented or sealed in the manner previously discussed. Volume 427 is optionally sealed by a seal 429, such as a gasket or sealant. Seal 429 optionally contains a desiccant effective to prevent condensation of moisture from volume 427. The desiccant can be in any convenient place in any convenient form such as, for example, placed as porous blocks in recesses in frame 425, coated onto the interior surface of frame 425, formulated into the composition of the frame, or placed as powder in replaceable compartments about frame 425, effective to provide communication to volume 427 to prevent condensate formation from volume 427. The desiccant can be any convenient material such as, for example, silica gels or molecular sieves. A particular example is Molecular Sieve 4000 from UOP in Des Plains, Ill.

Chromogenic panel 423 can be controlled in the same manner as the window assembly 301, using a control system (not shown) of the same type as control system 335, and/or the circuitry shown in FIGS. 14–16C. If so desired, a sleeper circuit (not shown) comparable to that depicted in FIG. 2 can be included.

The skylights could be coupled with radiation sensors (i.e. visible and solar) and energy management systems to automatically control their transmissivity/reflectivity in order to optimize the use of lighting and electrical energy, as well as to maximize user comfort. In this regard, a computerized control system for buildings called TABS™ was recently announced by NETMEDIA Inc. of Tucson, Ariz. This and other climate control systems for autos and buildings could be adapted for skylights.

It will be appreciated that chromogenic panel 423 can be provided with a hinge (not shown) effective to allow chromogenic panel 423 to be tilted and appropriately drained of any condensation from volume 427.

It will be appreciated that dome 421 can consist of two or more pieces wherein the pieces can be made of plastics or glass. The volume between such multiple pieces provides additional thermal break. Further, at least one of the one or more pieces can be diffused.

It will be appreciated that a diffuser panel (not shown) can be provided above or below chromogenic panel 423. Further, chromogenic panel 423 itself can be diffused. Chromogenic panel 423 can be made a diffuser by making a transparent coating which serves both as a diffuser and as an electrode on chromogenic panel 423. An example of such suitable light scattering electrode coatings that are available commercially are TEC 8 from Libby-Owens-Ford (Toledo, Ohio). Other suitable examples are TEC 10 and TEC 15, from the same source, which scatter decreasing amounts of light.

Optionally, one or more sensors can monitor the outside light level, the inside light level, and the inside and/or outside temperature. The data is then processed and used to control the skylight's optical density. Further, the data can be used to control any other convenient auxiliary devices such as, for example, air blowers, air conditioners, heaters, skylights, or lights.

Another way to control the darkening of the panels throughout the year can be done as follows: the input from the above described temperature and light sensors can be combined so that in the summer months the panel can darken during the day. During winter days the panel could be in the bleached state allowing most of the solar radiation to pass through. Such skylights can be used with great benefit for daylighting and thus reduce energy requirements. For example, a skylight optimally sized for daylight in winter is typically 10 times too large for summer, causing excessive energy costs. See Day Chahroudi, "Is the Time for Smart Windows Here?", Glass Digest, May 15, 1996, p. 54. However, the system of the present invention provides a skylight that can readily be optimally sized for winter and then changed to be optimally sized for summer. By optimally sized, it is meant that the amount of transmitted solar radiation is optimized. In addition, the skylight of the present invention could be dim during the day and bleached during morning and late afternoon to enjoy the benefits of daylighting for longer periods during the day.

In addition, a sensor can monitor the electrical flow of the applied signals of the chromogenic skylight of the present invention. The output of such a sensor can be used to control any other convenient auxiliary devices such as, for example, air blowers, air conditioners, heaters, skylights, or lights.

Further, the skylight chromogenic panel can include different individual sections that can be individually controlled to compensate for uneven exterior lighting or to create special effects. For example, EC cells can be partitioned in various sections, as described earlier, so that these sections of the panel are addressed selectively throughout its area. Such individual sections could be programmed to follow the tracking of the sun throughout the day thereby compensating for differing illumination or for shadows.

The skylight of the present invention can be made by the processes detailed elsewhere herein for other embodiments of the present invention, can be controlled as described elsewhere herein for other embodiments of the present invention, and is powered as described elsewhere herein for other embodiments of the present invention.

THIRD EMBODIMENT

Figure 13:
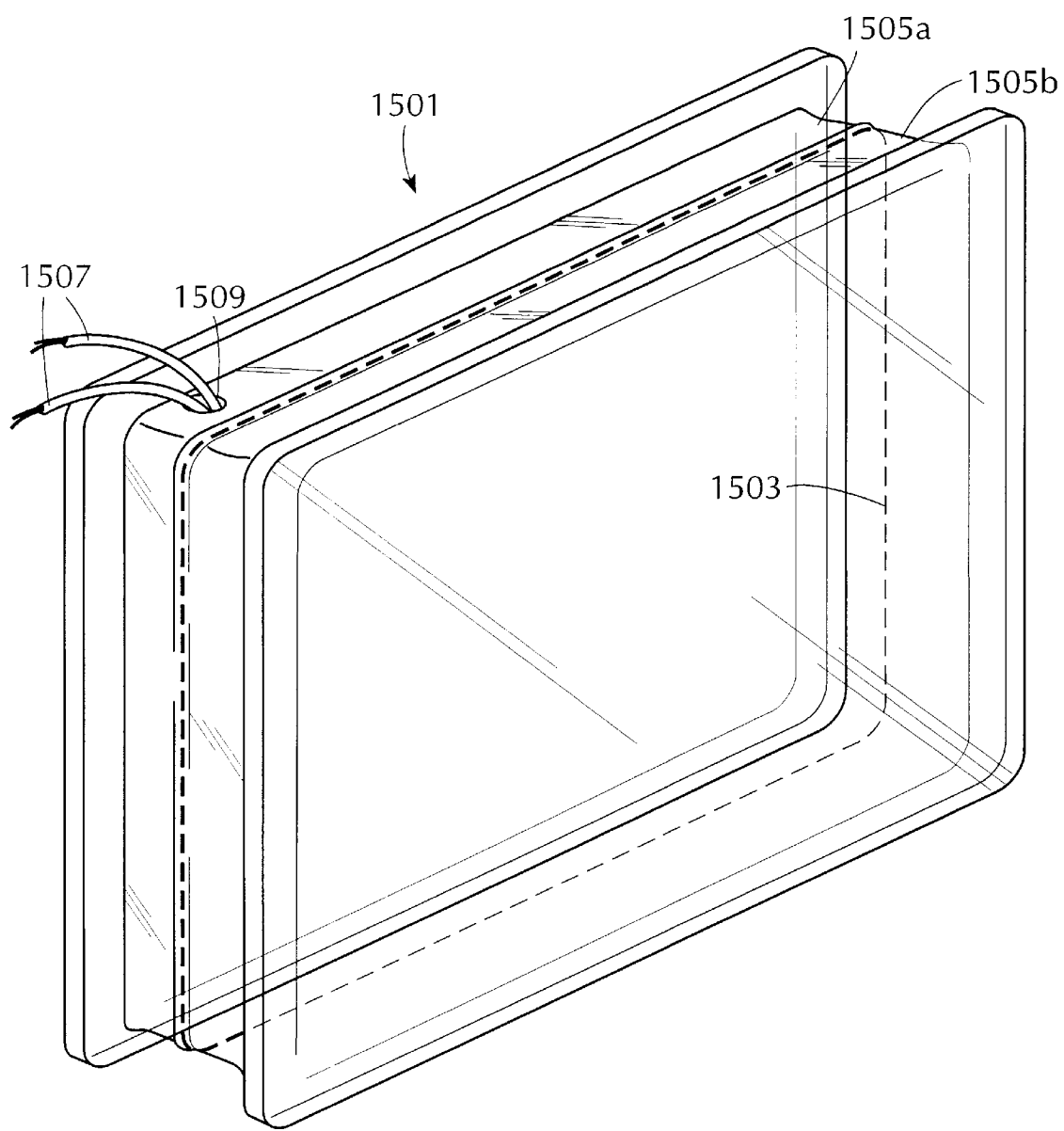
FIG. 13 is a perspective view of a block, possibly made of glass and/or plastic, having a chromogenic panel which provides the block with variable transmissive properties, and suitable for architectural use.

FIG. 13 depicts an architectural glass or plastic block constructed in accordance with the present invention. The glass block 1501 is formed with a flat panel chromogenic device 1503 located between opposing sides 1505a and 1505b, which are non-flat, of the block. This way, radiation passing through the block from one side to another can be attenuated.

Chromogenic device 1503 could be formed and controlled in the manner of any of the types of known chromogenic devices previously discussed, or even devices not currently known in the art. If appropriate to the type of chromogenic device, power leads 1507 or other control leads would pass through a small opening 1509 in the block and lead to the chromogenic device 1503, facilitating control of the optical properties of the block.

It will be appreciated that the block 1501 could be formed in a variety of ways, whether by molding to form a single glass block around the chromogenic device, laminating the chromogenic device between two separate, pre-formed block halves, or even machining a slot into an existing block so that the block will accept a flat chromogenic device which is later inserted thereinto.

Such a block can be used in a wide variety of ways. For example, the block could be used as part of the interior or exterior structure of a building to form a variable opacity window or wall. The block also could be used in an interior divider, or even as part of a skylight.

FOURTH EMBODIMENT

Building glazing typically consists of multiple panel units such as dual pane insulated glass units ("IGU's"). Chromogenic elements such as electrochromic and/or photochromic elements could be incorporated into any of these panels. The outer panel could be tinted and/or be provided with a low-E coating, an ultraviolet barrier coating, a scratch-resistant coating, etc. Moreover, either a single film or multiple films could be used for this purpose. Single coatings or films could have multiple functionalities, such as of tint, low-E, ultraviolet barrier, etc. These coatings can be provided on either side of the outer panel, that is, either facing inwards or outwards, depending upon the nature of the materials and the functionality/purpose of the product. The coatings may be placed on both sides of the outer panel or even on the chromogenic panel side that faces the outer panel. For example, in and IGU it may be preferable if the inner face of the outer panel is coated with a low-E material and the face of the chromogenic element facing the outer panel is coated with an ultraviolet blocking layer.

Alternatively, the desired optical and/or physical properties could derive from the intrinsic properties of the material from which the panels are made. That is, the panels could be made such that he desired optical or other properties are provided as a consequence of the basic composition or structure of the panel. For example, dopants could be added to glass to alter its light transmission properties, and visible, infrared or ultraviolet blocking agents could be added to plastic (typically, if it is used as the outer panel),or for one of the substrates in the chromogenic panel that faces the outer panel.

Moreover, this construction could be provided with thermal and ultraviolet breaks in the same manner as the chromogenic sunroof construction already discussed.

Finally, one could, without departing from the spirit of this invention, include a free-standing film or another element which has the desired property(ies) between the outer protective panel and the chromogenic panel.

FIFTH EMBODIMENT

Figure 11:
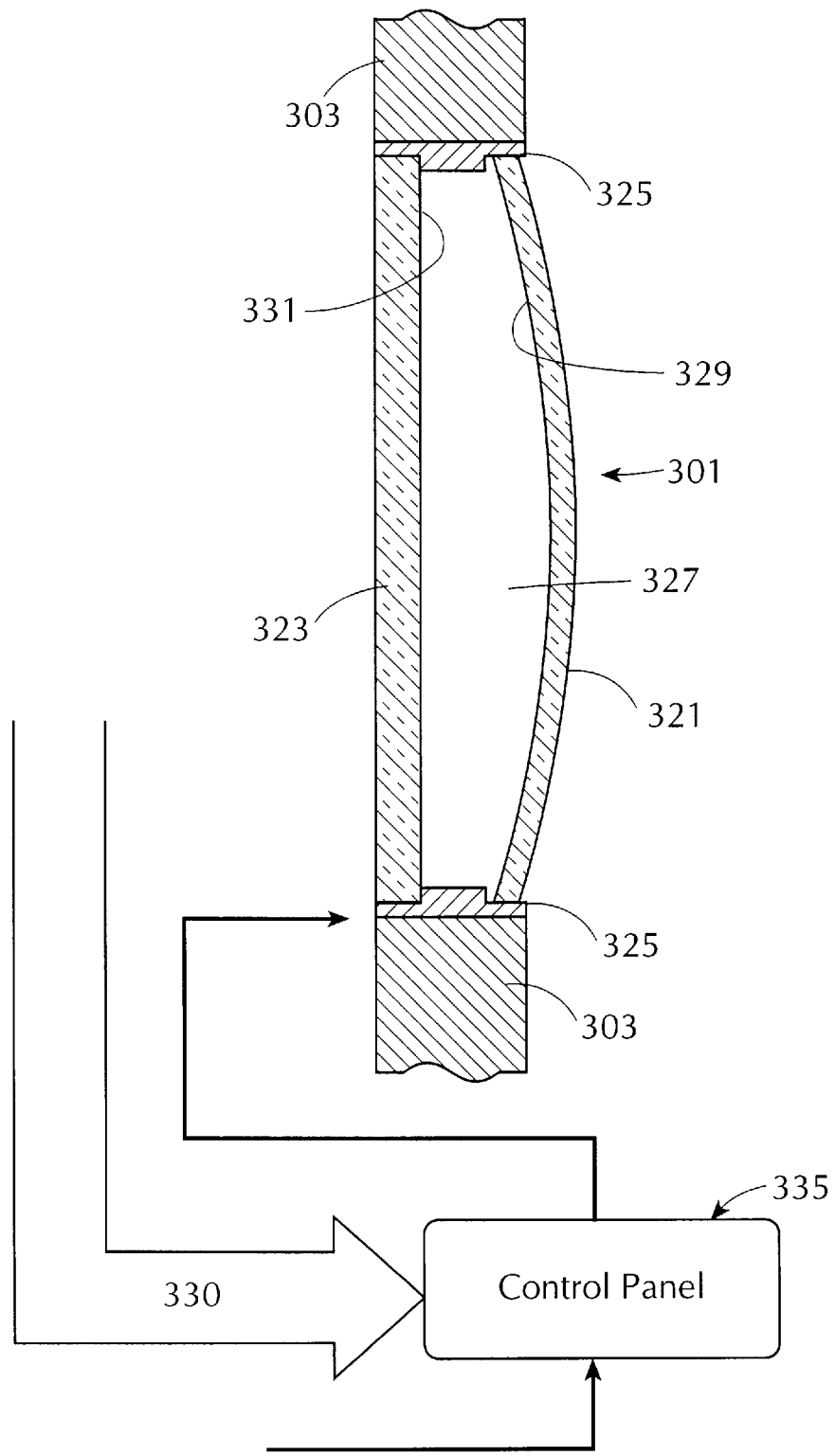
FIG. 11 is a schematic cross-sectional view of a chromogenic window construction suitable for architectural use.

FIG. 11 illustrates an example of an IGU in the form of a chromogenic window assembly 301. The window assembly 301 includes both an outer panel 321 and a chromogenic inner panel 323. Each panel 321 and 323 is held by a frame member 325, and the frame member is secured to wall 303. As shown, the panels are separated by a volume 327 (e.g., air) therebetween. The volume 327 may be vented to the environment, sealed, filled with an inert gas, or even air-conditioned, if so desired.

The outer panel 321, which is of convex curvature, is preferably made of transparent material durable enough to withstand all foreseeable occurrences. Either side, and preferably the interior side 329 of the outer panel 321 could be covered with a low-E coating, tinting, a UV-barrier, or scratch resistant coating. These coatings may be single or multiple layers which combine several of these features.

Likewise, chromogenic panel 323 is made of suitable material, and may have single or multiple coating layer(s) 331 having, for example, an ultraviolet-radiation blocking property, a low-E characteristic or other desirable property.

SIXTH EMBODIMENT

FIG. 11 illustrates an example of an IGU in the form of a chromogenic window assembly 301. The window assembly 301 includes both an outer panel 321 and a chromogenic inner panel 323. Each panel 321 and 323 is held by a frame member 325, and the frame member is secured to wall 303. As shown, the panels are separated by a volume 327 (e.g., air) therebetween. The volume 327 may be vented to the environment, sealed, filled with an inert gas, or even air-conditioned, if so desired.

The outer panel 321, which is of convex curvature, is preferably made of transparent material durable enough to withstand all foreseeable occurrences. Either side, and preferably the interior side 329 of the outer panel 321 could be covered with a low-E coating, tinting, a UV-barrier, or scratch resistant coating. These coatings may be single or multiple layers which combine several of these features.

Likewise, chromogenic panel 323 is made of suitable material, and may have single or multiple coating layer(s) 331 having, for example, an ultraviolet-radiation blocking property, a low-E characteristic or other desirable property.

The optical properties of the chromogenic panel 323 are regulated by a controller 335 in accordance with signals 330 sent thereto. Those signals can come from either sensors (not shown) or a user. In response, controller 335 sends a control signal to the chromogenic panel, controlling its optical properties thereby. The controller could be constructed in accordance with the teachings of FIGS. 14–16C, and the corresponding sections of this specification.

If further desired, a free-standing film or other element could be positioned between the outer and chromogenic panels.

The window panel can be constructed using any of the techniques previously discussed elsewhere herein, for example, in connection with the sunroof.

SEVENTH EMBODIMENT

The present invention includes incorporating flat chromogenic panels in light pipes and light tubes ("light pipes"). Conventional light pipes and light tubes are made by several manufacturers, for example, Solatube (Carlsbad, Calif.), Daylite Company (Ventura, Calif.), and Tubular Skylights (Sarasota, Fla.). In many applications, light pipes replace skylights, hence many advantages such as daylighting applies here similar to those described earlier with respect to the present invention's application to skylights.

These conventional light pipes typically consist of a reflecting rigid or flexible tube of about 8 to 30 inches in diameter that is installed by cutting a hole in the ceiling and the roof. On the outside typically a spherical shaped plastic dome is attached. For the reasons described above, this plastic dome can be more than a single sheet of material. Light is harvested through this light transmitting dome, reflected from the reflective internal sides of the tube and brought inside the building. Tubes are typically 3–6' in length. On the inside a flat or a dome shaped diffuser is usually attached. During a bright day the interior dome appears as a bright lamp.

According to the present invention, instead of making a curved chromogenic dome to replace the curved plastic dome, the light transmission of a light pipe can be controlled by inserting a flat chromogenic panel inside the tube. As described above, the chromogenic panel itself may be used as a diffuser panel.

As shown in FIG. 17A, a complete light pipe assembly 1700 is mounted in a house with a sloped roof 1790 and a horizontal ceiling 1791. Light pipe assembly 1700 includes a tube 1701 and a curved outer transparent dome 1715 which serves to harvest the exterior light. Tube 1701 is any convenient hollow rigid or flexible tube having any convenient cross-sectional shape such as, for example, square, rectangular, circular, or freeform. In this example, the tube was cylindrical with a substantially circular cross-section. Typically the interior of the tube is highly reflective.

An inner panel 1716 has an attached lens 1703 which serves as a diffuser. The lens may be designed using diffractive and/or geometrical optics to distribute the light in a desirable pattern. A chromogenic panel 1702 rests on lens 1703. In this embodiment, chromogenic panel 1702 is advantageously a flat, circular panel, although any convenient suitable shape can be used. When the user desires the light pipe to emit less light, chromogenic panel 1702 is darkened.

Figure 18A:
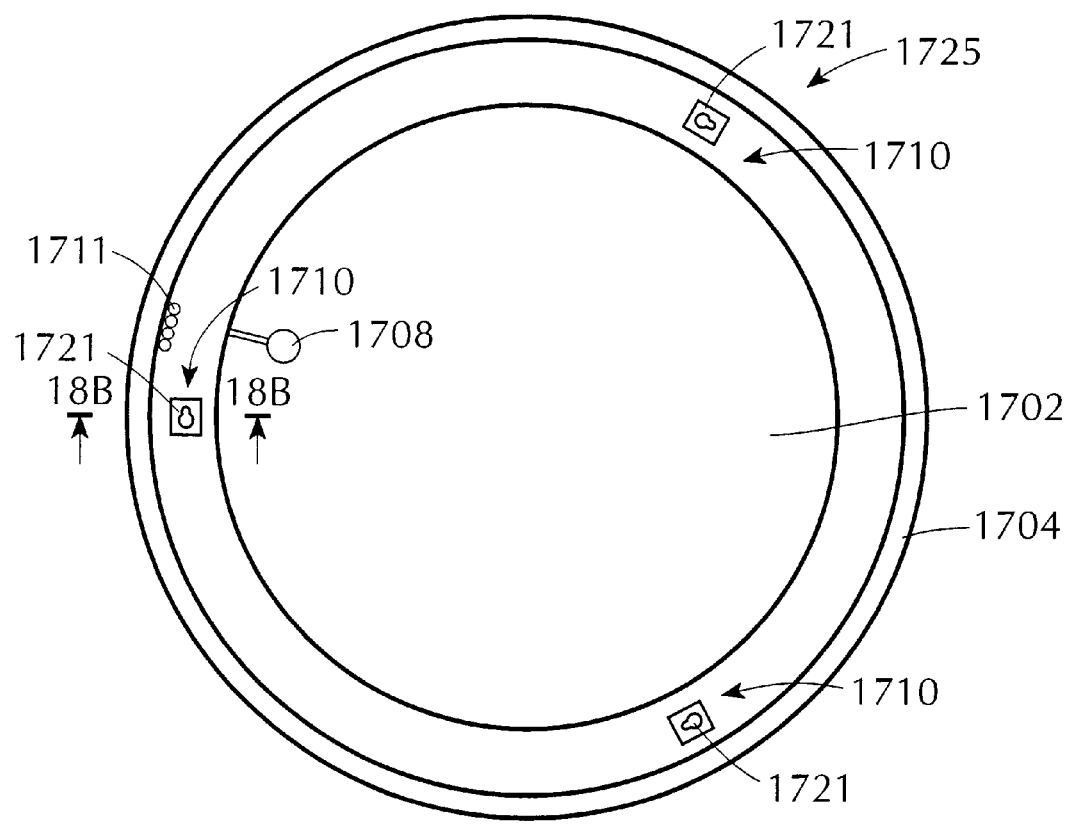

FIG. 17B shows a close up view of the construction of this embodiment. A composite assembly 1725 shown in FIGS. 18A and 18B, includes chromogenic panel 1702, lens 1703, a bezel 1704, and mounting hardware including at least one of a tab 1710. Tab 1710 is attached to bezel 1704. Chromogenic panel 1702 and lens 1703 are constrained in bezel 1704.

At least one optional light sensor 1708 is shown mounted effective to measure light. The light measured can be the incoming light, the transmitted light, the light in the room, the outside light, or any combination. Sensor and cell cable outlets 1711 can be provided for access to the light sensor 1708.

Composite assembly 1725 is mounted to ceiling 1791 by engaging tab 1710 with a fastener 1706. Fastener 1706 is attached to ceiling 1791 effective to engage a fastener head 1720 with a suitably mating hole 1721. Mating hole 1721 is provided in each of tabs 1710. In this embodiment, fastener 1706 is a screw screwed into ceiling 1791. Fastener head 1720 in this case is the screw head. Mating hole 1721 is a key shaped hole in this case. Sufficient clearance is left between fastener head 1720 and ceiling 1791 to allow engagement of mating hole 1721.

Any suitably shaped fastener can be used such as, for example, a nail, bolt, or spike. Mating hole 1721 can be any convenient shape that has a dimension which allows fastener head 1720 to pass through and another dimension which does not allow fastener head 1720 to pass through. Such hole shapes include for example, a triangle, an ellipse, or a dog bone shape.

Figure 18B:
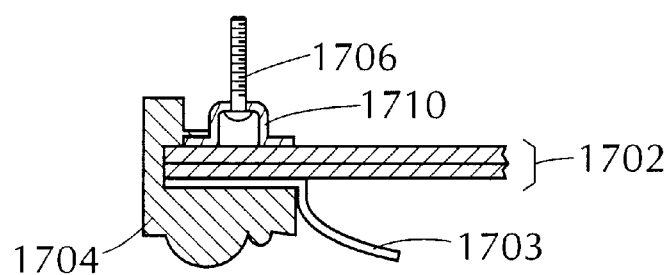
FIG. 18B is a schematic partial sectional view of a mounting hardware assembly thereof.

Composite assembly 1725 is shown in plan view in FIG. 18 and in partial sectional view in FIG. 18B. Composite assembly 1725 is easily mounted or replaced for servicing by connecting at least one lead 1729 through a connector 1709, and positioning and twisting composite assembly 1725 in place around fasteners 1706 that are pre-mounted on ceiling 1791.

Composite assembly 1725 can be made, for example, by placing the chromogenic panel 1702, lens 1703, and mounting hardware in a mold. A plastic is then injected into the mold to bond these elements together while forming bezel 1704. An injection molding process may be used to form composite assembly 1725. Exemplary materials for this molding process include plasticized PVC, thermoplastic rubbers (olefinic rubbers, urethanes, polyesters etc.), and ethylene propylene diene rubber (EPDM). Alternatively, other molding processes can be used such as, for example, reaction injection molding, resin transfer molding, and casting into open molds. Such molding processes can include molding with a liquid as a starting material. Typical processes used are resin transfer molding and reaction injection molding. Materials for these processes include, for example, two component urethanes, polyesters crosslinked with styrene, silicones, and epoxies. Details of urethane chemistry and other additives such as catalysts, colorants, UV stabilizers etc. are well known and can be found, for example, in the *Polyurethane Handbook, 2nd Edition* (1993, Gunter Oertel). In the two component urethane class, aliphatic isocyanates are preferred to aromatic isocyanates due to their better UV durability.

The above embodiment includes a lens 1703 and a flat chromogenic panel 1702. However, if desired, many other constructions are also possible for both aesthetic and practical reasons. For example, lens 1703 may be flat, curved, or of a shape other than curved. Chromogenic panel 1702 may be composed of one or more electrochromic panels. A fresnel type of flat plastic lens could be glued to chromogenic panel 1702. The surface of the chromogenic panel 1702 may be patterned so that the inner lens can be eliminated. The chromogenic panel may also be patterned with designs such as planets, stars etc. which would be useful for a child's room or nursery.

Further, as described earlier, to provide added safety, the surface of the chromogenic panels facing the room interior and/or the surface of the chromogenic panels facing the outer light harvesting dome can be contacted with a layer or multilayer of polymer such as a plastic material. Examples of such materials are recited in U.S. Pat. No. 5,239,406 (Lynam), previously discussed, and include a polyester/polyvinylbutyral composite layer and a reticulated polyurethane. As described earlier, SECURIFLEX® material, manufactured by Saint-Gobain Vitrage or SPALLSHIELD®, manufactured by Dupont of Wilmington, Del., can be used. Still another example, as described above, is LEXAN®HP12W and HP92W, a polycarbonate sheet made by General Electric Plastics Structures Products of Pittsfield, Mass. These can be laminated onto the dome, laminated onto either side of the chromogenic panels, or inserted between the chromogenic panels and the outer dome.

As a result, should the panel break, the SECURIFLEX®, or LEXAN® layer or sheet, or the SPALLSHIELD® layer will prevent pieces of glass or plastic from shattering into the interior (and will also prevent leakage of material from the chromogenic, i.e. electrochromic, medium into the interior). When such layers are placed on the surface of the chromogenic panel facing the light harvesting dome, they can fulfill the dual beneficial role of providing safety protection and ultraviolet radiation reduction protection for the chromogenic medium. These materials may be incorporated onto the substrate before assembling the EC panels or they may be incorporated after assembling the EC panels. Standard lamination procedures such as autoclave which uses elevated pressure and temperature, a standard lamination autoclave process, could be used to incorporate these materials.

The chromogenic panel optionally includes a plurality of individual sections, individually controllable. Such individual sections can be formed by attaching together individual chromogenic sections or, for example, optionally making the chromogenic panel by etching lines in the transparent conductors, chromogenic conductors (not shown) so that individual parts of the panel are addressed selectively throughout its area. Examples of transparent conductors include indium oxide and doped tin oxide.

Examples of chromogenic conductors include tungsten oxide, vanadium oxide, and polyaniline. Such internal sections could be programmed to follow the tracking of the sun throughout the day to compensate for sun angle and light intensity. Optional light sensors can provide data for such programmed control of the light output. Another way to control the light intensity is to divide the EC cell in sections in the shape of annular rings. These rings can be addressed individually. Depending on the required light intensity, any number of such rings may be darkened. A fine control over the precise light throughput intensity can be further provided by exercising control on the extent of shade to which each ring is darkened.

To further enhance the aesthetics of the device, bezel 1704 could be painted and textured to match the decor of room. This could also be accomplished by in-mold paint transfer during the forming process or using pre-colored molding materials.

The light pipe could be operated either manually or automatically. For manual operation, a switch may be installed at any convenient location to control the darkness (transmissivity) of the chromogenic panel. This switch can be installed in combination with other switches for lights, fans, etc. If a light switch is impractical, the transmissivity can also be controlled via a hand-held remote control unit.

If automatic operation is desired the light pipe may be coupled to temperature or photosensors. Based on pre-set limits, when the temperature or light level gets too high, the chromogenic panel may be automatically darkened. This can be done to maximize daylight and minimize heat flow throughout the day. The chromogenic panel may also be set on a timer to program it to darken at different times of the day. If the chromogenic panel is set according to any of the sensors described above, the power draw caused by the darkening of the chromogenic panel may be used as a signal to activate or de-activate other building functions such as auxiliary lighting, air conditioning, or heating for example.

Control for skylights/light pipes are similar to the controls described elsewhere herein above. The power to chromogenic panel 1702 is provided, for example, by a solar cell (not shown) that is mounted at any convenient location suitable to receive light for electrical conversion, preferably as an integrated part of the light tube. A rechargeable battery 1730 is optionally used for powering chromogenic panel 1702, and the solar cell could be used for recharging battery 1730. Alternatively, the house power can be regulated to supply power to chromogenic panel 1702 and to recharge battery 1730. The control for chromogenic panel 1702 could be mounted on a wall and resemble a light switch. Alternatively, it could be through a remote such as, for example, an infrared (IR), or a radio frequency (RF), remote similar to that used for other devices such as television and garage door openers, respectively. However, one has to take precautions that these do not inadvertently interfere with other appliances or devices in the house.

The same remote could be used to address several skylights, windows and light pipes in the house/building individually or collectively. Through the remote, these products could be programmed to darken the chromogenic devices during certain periods in the day. A photosensor could be located in the room, below the skylight, in the tube, or even outside, that could automatically darken the chromogenic panel to a pre-determined level depending on the sensed light intensity. The photo-sensing system may even be combined with a thermal detector (e.g., a thermocouple, thermistor, etc., located inside and/or outside, but as a part of the system) that will darken the chromogenic panel only above a certain temperature during the day. An automatic system with no manual control necessary may use the two types of sensed signals described above. Such an automatic system would reduce the light transmission during summer months (or hot days) and allow a large amount of solar radiation in during the winter (or cold days). Other devices can be conveniently controlled such as, for example, air blowers, air conditioners, heaters, skylights, and other light pipes, together with the light pipe of the present invention.

EIGHTH EMBODIMENT

FIG. 19A and FIG. 19B show another embodiment of the present invention wherein a chromogenic panel 1902 is mounted anywhere within a tube 1901 of a light pipe assembly 1900 and is independent of a composite assembly 1925. Tube 1901 is any convenient hollow rigid or flexible tube having any convenient cross-sectional shape such as, for example, square, rectangular, circular, or freeform. In this example, the tube was cylindrical with a substantially circular cross-section.

Composite assembly 1925 includes a lens 1903 constrained by a bezel 1904. Bezel 1920 has a recess 1928 which accommodates a fastener head 1920 of at least two fasteners 1906 which are fastened to a ceiling 1991. Lens 1903 includes a mating hole 1927 which engages fastener 1906 proximate to fastener head 1920 to support composite assembly 1925 against ceiling 1991. Alternatively, composite assembly 1925 can be assembled on-site by first fastening lens 1903 to ceiling 1991 with at least two fasteners 1906. Bezel 1904 is then secured around lens 1903 by fasteners (not shown).

Figure 20:
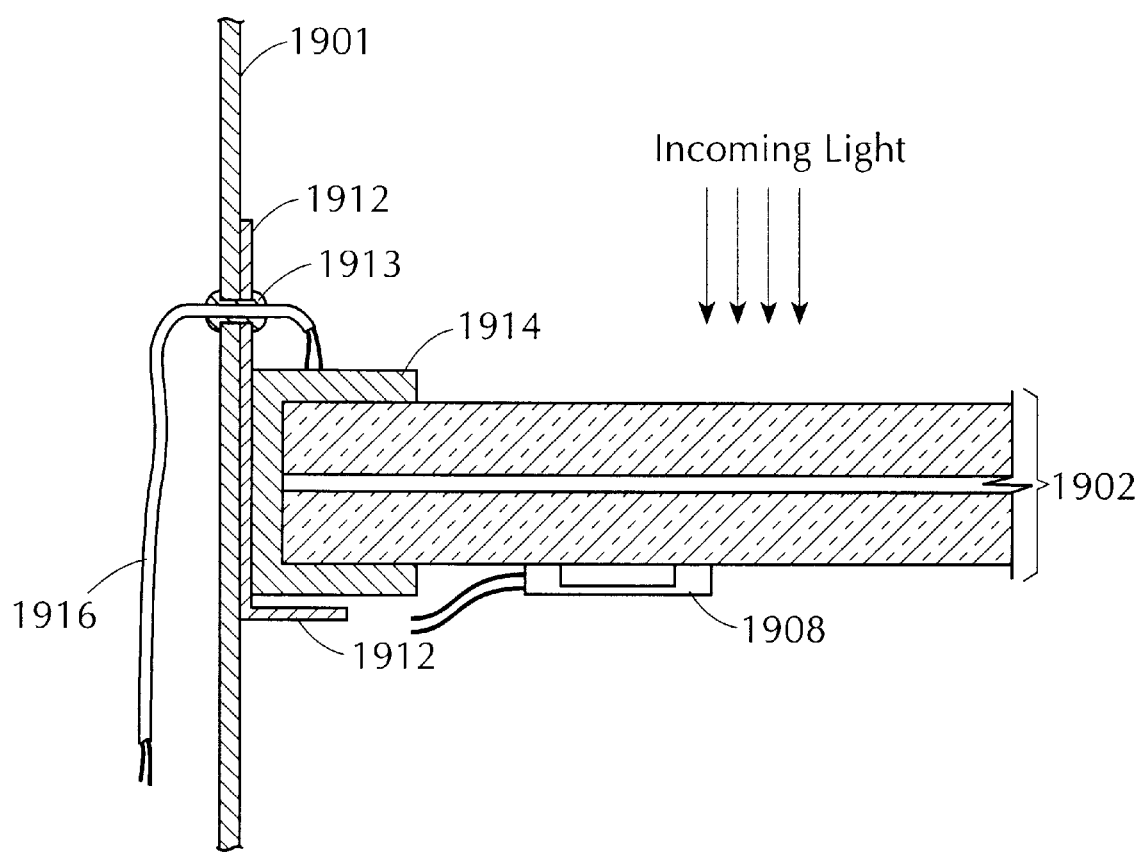
FIG. 20 is a schematic expanded partial sectional view of the mounting of an EC panel within a light tube according to an embodiment of the present invention.

The mounting for this embodiment is shown in greater detail in FIG. 20. Chromogenic panel 1902 is mounted on to an L-clip 1912 by a constraining surround 1914 which is any convenient means such as, for example, a trim or an encapsulation. L-clip 1912 is mounted to tube 1901 at one or more sites by any convenient means such as, for example, screws, rivets, adhesives, or tape. One or more cables 1916 to a control box (not shown) is threaded through a hollow rivet 1913. This embodiment also allows the retrofitting of a chromogenic panel into an existing light pipe. A slot can be cut into the existing light pipe and the chromogenic panel can be inserted into the slot.

Power to chromogenic panel 1902 may be provided by a solar cell (not shown) that is mounted at any convenient location suitable to receive light for electrical conversion. Such a location can be an integrated part of the solar tube at an exterior surface. A rechargeable battery 1930 optionally is used for powering the panel, with the solar cell recharging battery 1930. Alternatively, the house power can be regulated by a voltage regulator (not shown) to supply power to this panel.

The control (not shown) for chromogenic panel 1902 could be mounted on any convenient location such as, for example, a wall. The control resembles a light switch. Alternatively, control of the operation of chromogenic panel 1902 could be with a remote control unit (not shown). Such a remote control unit is any convenient type such as, for example, an infrared (IR) remote like that used for appliances such as televisions. The same remote control unit can be used to address several skylights, windows and light pipes in the building individually or collectively. Through the remote control unit, such devices can be programmed to darken the chromogenic devices during certain periods in the day.

Optionally, at least one photosensor 1908, located at any convenient location such as, for example, in the room, below the skylight, in the tube, at either side of chromogenic panel

1902, on an outside surface, or any combination of locations, automatically darkens chromogenic panel 1902 to a pre-set level depending on the sensed light intensity in order to a pass a pre-set level of light to the room.

The photo-sensing system including photosensor 1908, controls, and power supply is optionally combined with a thermal detector (not shown). Such thermal detectors are any convenient means such as, for example, a thermocouple or a thermistor located inside and/or outside. This optional system controls chromogenic panel 1902 as a function of light and temperature. Such a system is optionally completely automatic, requiring no manual control that uses the sensed signals described above of temperature and light to control chromogenic panel 1902. This automatic system can, for example, reduce the light transmission during summer months (or hot days) and allow a large amount of solar radiation in during the winter (or cold days). Other devices can be conveniently controlled such as, for example, air blowers, air conditioners, heaters, skylights, and other light pipes, together with the light pipe of the present invention.

NINTH EMBODIMENT

The light pipe features of the present invention can be further enhanced by providing auxiliary light from a light source, such as from a lamp, between the chromogenic panel and the diffuser panel. This light source could be from any convenient source such as, for example, incandescent bulbs, halogen bulbs, fluorescent bulbs, ring-shaped fluorescent bulbs, metal vapor lamps, or plasma lamps. For night illumination, the light could be turned on. Thus the light pipe could have utility both during the day and night.

Figure 21:
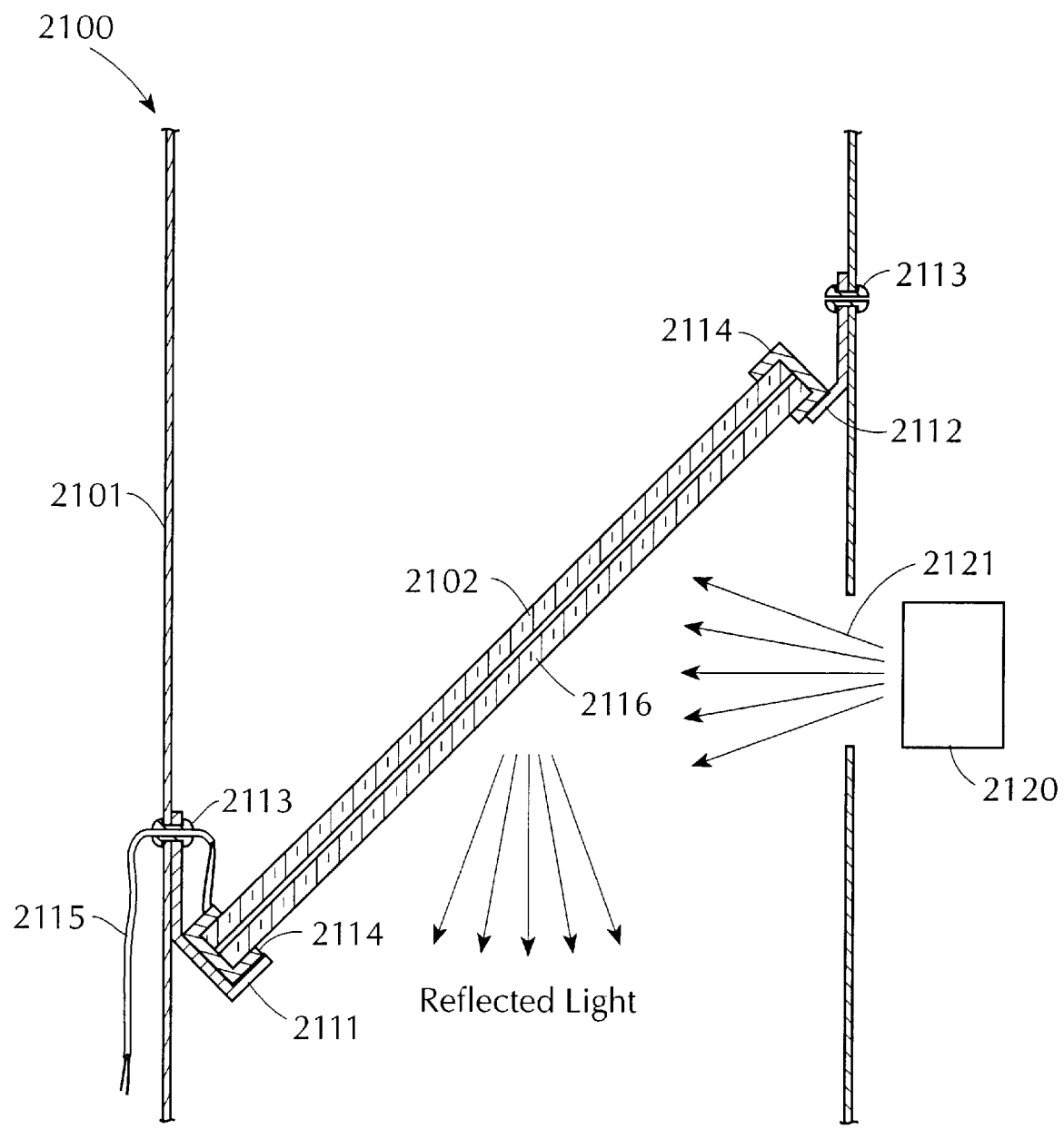
FIG. 21 is a schematic partial sectional view of a light tube according to an embodiment of the present invention.

FIG. 21 shows part of a light pipe 2100. A flat chromogenic panel 2102 is mounted in a tube 2101 at an incline relative to the tube 2101 axis. Chromogenic panel 2102 is held by at least two clips 2111 and 2112 to tube 2101. Clips 2111 and 2112 are fastened to tube 2101 by at least two fasteners 2113. Electrical connection to chromogenic panel 2102 is by at least a cable 2115 through at least an opening in a fastener 2113. Tube 2101 is any convenient hollow rigid or flexible tube having any convenient cross-sectional shape such as, for example, square, rectangular, circular, or freeform. In this example, the tube was cylindrical with a substantially circular cross-section.

For tube 2102 having a circular cross-section, chromogenic panel 2102 is elliptical in shape to maximize coverage of the transverse area of tube 2101. Any convenient suitable shape can be used but it is advantageous to maximize coverage in order to maximize light throughput for a given optical density of the chromogenic panel. It is appreciated that the shape of chromogenic panel 2102 is any convenient shape that maximizes coverage of the transverse area of tube 2101 for a given angle from orthogonal to the tube axis.

It can be seen that this geometry causes more light to be absorbed by chromogenic panel 2102 for a given transmission density as compared to a chromogenic panel mounted orthogonal to the tube 2101 axis. Thus light pipe 2100 is darker when the chromogenic panel 2102 is colored in comparison to other light pipes with chromogenic panels mounted orthogonal to their axis. As a result, light pipe 2100 has advantages for applications where the exterior light is extremely bright.

It is appreciated that the axis of the light pipe tube, for straight tubes, is the longitudinal straight line with respect to which the light pipe tube is substantially symmetrical. However, as used herein, the axis of the light pipe tube for curved or bent tubes is the locus of points that are centers of transverse sections of the light pipe tube. Further, the center of a transverse section is defined as the center of mass of such transverse section.

An auxiliary light source 2120 provides light which reflects off a surface 2116 of chromogenic panel 2102. Auxiliary light source 2120 is shown shining light through an opening 2121 in tube 2101. Opening 2121 can have a transparent cover (not shown). Auxiliary light source 2120 can be located inside tube 2101 to direct light at surface 2116. Surface 2116 optionally can have a surface coating (not shown) to increase reflectivity.

The reflected light augments the light output of light pipe 2100 without the reflected auxiliary light. This is useful, for example, at night when additional illumination is needed. Thus, light pipe 2100 can serve as both a source of natural and artificial lighting.

FIG. 21 shows the auxiliary light source as located to direct light towards chromogenic panel 2102 and reflecting from surface 2116 in the direction of the ceiling towards the room interior. In another embodiment, the auxiliary light source is positioned between the roof and the chromogenic panel so that the auxiliary light source's light passes through surface 2116 and accordingly is also selectively darkened at will.

Light pipe 2100 is made by similar processes described elsewhere herein, controlled by similar methods described elsewhere herein, and powered by similar methods described elsewhere herein.

TENTH EMBODIMENT

The present invention can also be used for aircraft windows. Windows in an airplane are often curved in a cylindrical form that typically conforms to the shape of the fuselage. Flat chromogenic panels can be added on the inside of the outer curved windows. For higher altitude aircraft such as jets, where pressurized cabins are used, an outer window is sealed to hold interior cabin pressure. An inner window, often of plastic, provides a protective layer and thermal insulation between passengers and the outer window. The flat chromogenic panel can be inserted between the outer sealed window and the inner plastic window. The control for the chromogenic panel is provided in the cockpit, where the pilot could tune the light transmission of all windows. In another mode the pilot could allow the passengers to adjust the light transmission by a control knob provided at each window.

Figure 22:
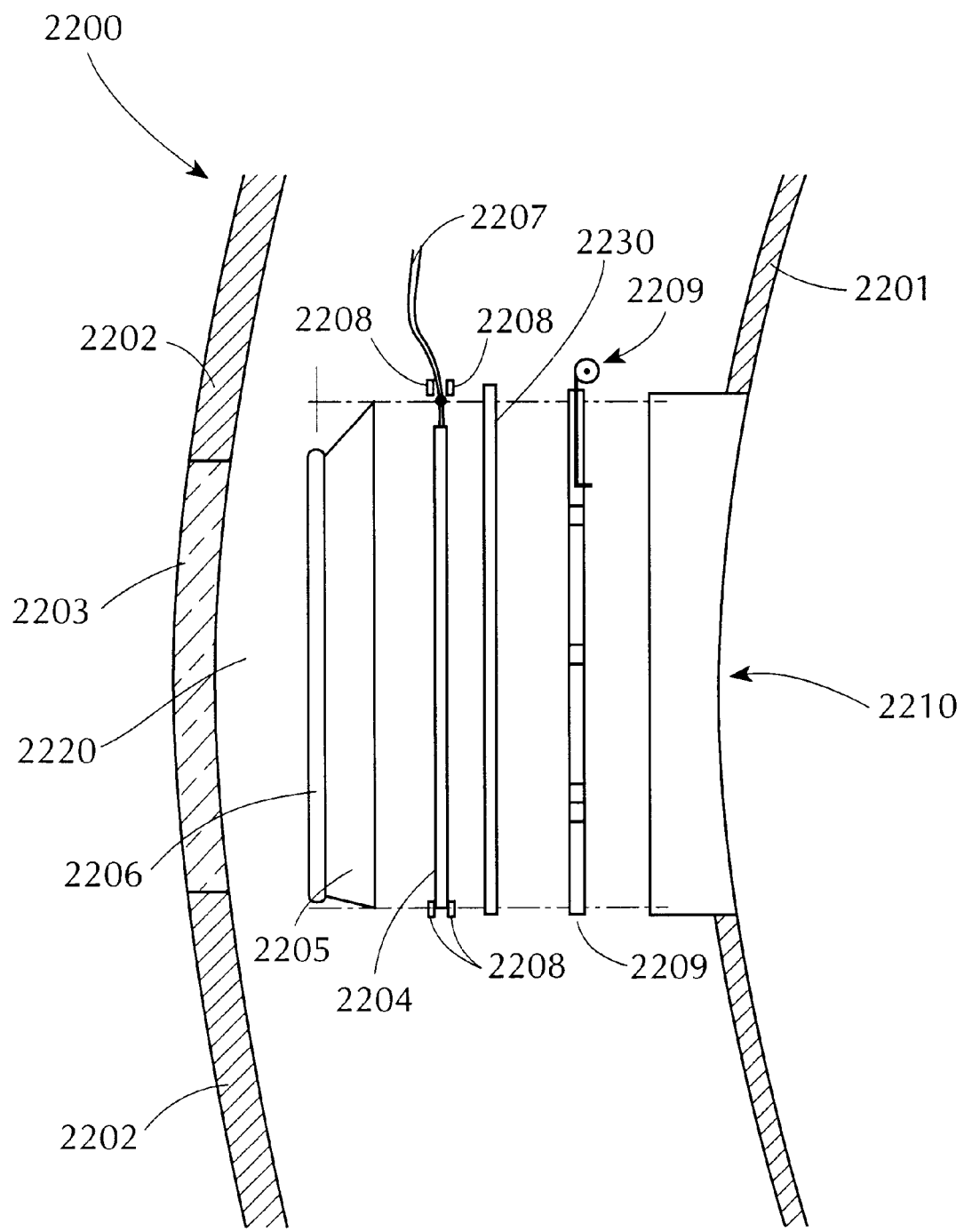
FIG. 22 is a schematic exploded sectional view of an aircraft window according to an embodiment of the present invention.

As shown in FIG. 22, an outer window 2203 is located on an outside structure 2202 of an airplane hull 2200. A window opening 2210 in interior panel 2201 provides visual viewing through outer window 2203. A chromogenic panel 2204 is mounted by a frame 2205 in window opening 2210 interior of outer window 2203. A gasket 2206 aids in sealing chromogenic panel 2204 from other parts of airplane hull 2200. A volume 2220 is formed by outer window 2203, gasket 2206, frame 2205, and chromogenic panel 2204. Electrical leads 2207 provide control of and power to chromogenic panel 2204. A curtain 2209 is optionally disposed interior of the window assemble containing chromogenic panel 2204. Optionally, a plurality of spacers 2208 provide alignment of chromogenic panel 2204 and can also prevent bending stresses from being transferred onto chromogenic panel 2204 during installation within window opening 2210. Optionally, an inner window 2230 contiguous to interior panel 2201 covers window opening 2210. Inner window 2230 is of any convenient shape such as, for example, flat, curved, or bent to conform with the curvature of interior panel 2201.

The optical properties of chromogenic panel 2204 are regulated by a controller (not shown) in accordance with signals sent thereto. Those signals can come from either sensors (not shown) or a user. In response, the controller sends a control signal to chromogenic panel 2204, controlling its optical properties thereby. The controller could be constructed in accordance with the teachings of FIGS. 14–16C, and the corresponding sections of this specification.

If further desired, a free-standing film or other element could be positioned between outer window 2203 and chromogenic panel 2204.

Additionally, the surface of chromogenic panel 2204 facing the interior of the aircraft can be contacted with a layer or multilayer of polymer, such as a plastic material. As described above, examples of such materials are recited in U.S. Pat. No. 5,239,406 (Lynam), and include a polyester/polyvinylbutyral composite layer and a reticulated polyurethane. For example, as previously described SECURIFLEX® manufactured by Saint-Gobain Vitrage or SPALLSHIELD® manufactured by Dupont of Wilmington, Del., can be used. Another example as described above is LEXAN®HP12W and HP92W, a polycarbonate sheet made by General Electric Plastics Structures Products of Pittsfield, Mass. This can be laminated onto the glass. This way, the laminate serves the purpose of interior panel 2230 thus eliminating the need for interior panel 2230.

Further, as discussed previously, when such layers are placed on the surface of the chromogenic panel facing the protective outer panel, they can fulfill the dual beneficial role of providing safety protection and ultraviolet radiation reduction protection for the chromogenic medium. As previously discussed, these materials may be incorporated onto the substrate before assembling the EC panels or they may be incorporated after assembling the EC panels. Standard lamination procedures such as autoclave which uses elevated pressure and temperature, a standard lamination autoclave process, could be used to incorporate these materials.

The aircraft window can be constructed using techniques previously discussed elsewhere herein, controlled using similar methods described elsewhere herein, and powered using similar methods described elsewhere herein.

Other variations and modifications of this invention will be apparent to those skilled in this art after careful study of this application. This invention is not to be limited except as set forth in the following claims.

What we claim is:

1. A chromogenic window panel assembly to be installed in a surface having a surface contour and subject to exposure to a solar radiation source, comprising:
   a chromogenic member having an optical property which varies according to an applied signal; and
   a light-transmissive outer panel substantially spaced from said chromogenic member, said outer panel being dimensioned and disposed so as to overlap at least a substantial part of the chromogenic member, and having a non-flat surface substantially following the surface contour, wherein said outer panel is disposed between said solar radiation source and said chromogenic member when said window panel assembly is installed in said surface, wherein said chromogenic member comprises a flat, electrochromic member.

2. A chromogenic window panel assembly as in claim 1, wherein said chromogenic member is selected from the group consisting of electrochromic devices, photochromic devices, liquid crystal devices, user-controllable-photochromic devices, polymer-dispersed-liquid-crystal devices, suspended particle devices, thermochromic devices, and thermotropic devices.

3. A chromogenic window panel assembly as in claim 1, further comprising a layer of a material disposed upon at least one of said chromogenic member and said outer panel.

4. A chromogenic window panel assembly as in claim 3, wherein said layer of said material changes an optical property of said chromogenic window panel assembly.

5. A chromogenic window panel assembly as in claim 3, wherein said layer of said material changes a physical property of said chromogenic window panel assembly selected from the group consisting of surface hardness, scratch resistance and shatter prevention.

6. A chromogenic window panel assembly according to claim 1, wherein said assembly comprises one of a vehicle sunroof, aircraft window, building skylight, building light pipe, and architectural block.

7. A chromogenic window panel assembly as in claim 1, wherein said chromogenic member comprises two separate, flat electrochromic panels.

8. A chromogenic window panel assembly as in claim 1, further comprising a thermal break.

9. A chromogenic window panel assembly as in claim 8, wherein said thermal break comprises an air volume.

10. A chromogenic window panel assembly as in claim 1, wherein said surface is a roof of a vehicle.

11. A chromogenic window panel assembly as in claim 1, further comprising:
    at least one of
       a first sensor positioned proximate to said outer panel so as to measure an amount of radiation which has come from outside and passed through said outer panel, said first sensor outputting a first signal in response thereto, and
       a second sensor positioned proximate to said chromogenic member so as to measure an amount of radiation which has first passed through said outer panel and then passed through said chromogenic member, said second sensor outputting a second signal in response thereto.

12. A chromogenic window panel assembly as in claim 1, further comprising a driver for supplying the applied signal to the chromogenic member.

13. A chromogenic window panel assembly as in claim 12, further comprising a controller which generates the applied signal applied by said driver to the chromogenic material so as to regulate the optical property of the chromogenic member.

14. A chromogenic window panel assembly as in claim 13, wherein the controller receives at least one of the first signal output from the first sensor and the second signal from the second sensor and generates the applied signal in accordance therewith.

15. A chromogenic vehicle sunroof to be installed in a vehicle roof and subject to exposure to a solar radiation source, said roof having a surface contour, comprising:
    a chromogenic member having an optical property which varies according to an applied signal; and
    a light-transmissive outer panel substantially spaced from said chromogenic member, said outer panel being dimensioned and disposed so as to overlap at least a substantial part of the chromogenic member, said outer panel having a predetermined non-flat surface substantially following the surface contour, wherein said outer panel is disposed between said solar radiation source and said chromogenic member when said vehicle sunroof is installed in said vehicle roof, wherein said chromogenic member comprises a flat, electrochromic member.

16. A chromogenic vehicle sunroof according to claim 15, further comprising:
a seal,
wherein said seal is dimensioned and disposed so that a volume is at least partially enclosed between said chromogenic member, said outer panel, and said seal.

17. A chromogenic vehicle sunroof as in claim 15, wherein at least one of a) an inner and an outer surface of said outer panel; b) an interior facing surface of said chromogenic panel facing the interior of the vehicle; and c) an outer panel facing surface of said chromogenic panel facing said outer panel is laminated with a polymeric layer.

18. A chromogenic vehicle sunroof as in claim 15, wherein said chromogenic member is selected from the group consisting of electrochromic devices, photochromic devices, liquid crystal devices, user-controllable-photochromic devices, polymer-dispersed-liquid-crystal devices, suspended particle devices, thermochromic devices, and thermotropic devices.

19. A chromogenic vehicle sunroof as in claim 15, further comprising a layer of a material disposed upon at least one of said chromogenic member and said outer panel.

20. A chromogenic vehicle sunroof as in claim 19, wherein said layer of said material changes an optical property of said chromogenic vehicle sunroof.

21. A chromogenic vehicle sunroof as in claim 19, wherein said layer of said material changes a physical property of said chromogenic vehicle sunroof selected from the group consisting of surface hardness, scratch resistance and shatter prevention.

22. A chromogenic vehicle sunroof as in claim 15, further comprising a driver for supplying the applied signal to the chromogenic member.

23. A chromogenic vehicle sunroof as in claim 22, further comprising a controller which generates the applied signal applied by said driver to the chromogenic material so as to regulate the optical property of the chromogenic member.

24. A chromogenic vehicle sunroof as in claim 23, further comprising a light sensor effective to measure a light intensity level and generate a responsive signal; wherein said controller generates said applied signal correspondingly to said responsive signal.

25. A chromogenic vehicle sunroof as in claim 24, further comprising an auxiliary device, wherein said controller generates a second auxiliary applied signal effective to cause said auxiliary device to respond correspondingly to said second auxiliary applied signal.

26. A chromogenic vehicle sunroof as in claim 25, wherein said auxiliary device is an automatic dimming mirror.

27. A chromogenic vehicle sunroof as in claim 23, further comprising:
a light sensor effective to measure a light intensity level and generate a responsive signal; and
a switch having a manual position and an automatic position, wherein said automatic position is effective to cause said controller to generate said applied signal correspondingly to said responsive signal.

28. A chromogenic vehicle sunroof as in claim 27, further comprising an auxiliary device, wherein said automatic position is further effective to cause said auxiliary device to respond correspondingly to said responsive signal.

29. A chromogenic vehicle sunroof as in claim 24, wherein said light intensity level is an ambient intensity; wherein said optical property is a transmittance; and wherein a higher intensity level of said ambient intensity causes a correspondingly lower level of said transmittance.

30. A chromogenic vehicle sunroof as in claim 15, wherein said chromogenic member comprises two separate, flat electrochromic panels.

31. A chromogenic vehicle sunroof as in claim 15, further comprising a thermal break.

32. A chromogenic vehicle sunroof as in claim 31, wherein said thermal break comprises an air volume.

33. A chromogenic window assembly to be installed in a surface having a surface contour and subject to exposure to a solar radiation source, comprising:
a chromogenic panel having an optical property which varies according to an applied signal;
a light-transmissive protective panel substantially spaced from said chromogenic panel, said protective panel having a protective non-flat surface substantially following the surface contour; and
a connecting member to which both said chromogenic panel and said protective panel are joined, wherein said protective panel is disposed between said solar radiation source and said chromogenic member when said window panel assembly is installed in said surface, wherein said chromogenic panel is approximately planar, and said protective panel has a curve formed therein.

34. A chromogenic window assembly as in claim 33, further comprising a driver which supplies the applied signal to said chromogenic panel so as to regulate the optical property of the chromogenic panel.

35. A chromogenic window assembly as in claim 34, further comprising a controller which generates the applied signal supplied by said driver to the chromogenic material so as to regulate the optical property of the chromogenic member.

36. A chromogenic window assembly as in claim 35, further comprising:
at least one sensor for measuring an ambient condition, said sensor outputting a sensor signal in response thereto; and
a conductor for carrying the sensor signal from said sensor to said controller,
wherein said controller regulates the applied signal in accordance with the sensor signal.

37. A chromogenic window assembly as in claim 33, wherein said chromogenic panel and said protective panel are each approximately planar and said connector holds said panels parallel to one another with a gap therebetween.

38. A chromogenic window assembly as in claim 33, wherein said chromogenic member is selected from the group consisting of electrochromic devices, photochromic devices, liquid crystal devices, user-controllable-photochromic devices, polymer-dispersed-liquid-crystal devices, suspended particle devices, thermochromic devices, and thermotropic devices.

39. A chromogenic window assembly as in claim 34, further comprising a layer of a material disposed upon at least one of said chromogenic member and said outer panel.

40. A chromogenic window assembly as in claim 39, wherein said layer of said material changes an optical property of said chromogenic window assembly.

41. A chromogenic window assembly as in claim 39, wherein said layer of said material changes a physical property of said chromogenic window assembly selected from the group consisting of surface hardness, scratch resistance and shatter prevention.

42. A chromogenic window assembly as in claim 33, wherein said chromogenic member comprises a flat, electrochromic member.

43. A chromogenic window assembly as in claim 33, wherein said chromogenic member comprises two separate, flat electrochromic panels.

44. A chromogenic window assembly as in claim 33, further comprising a thermal break.

45. A chromogenic window assembly as in claim 44, wherein said thermal break comprises an air volume.

46. A chromogenic window assembly as in claim 33, wherein said surface is a roof of a vehicle.

47. A chromogenic vehicle sunroof as in claim 23, wherein said controller further includes a sleeper circuit.

48. A chromogenic window panel assembly according to claim 1, wherein power responsive to said applied signal is supplied to said assembly from a power source selected from the group consisting of a solar cell and a rechargeable battery, said power effective to change said optical property, said change including the coloring or bleaching of said chromogenic member.

49. A chromogenic window panel assembly according to claim 48, wherein said applied signal is controlled by at least one of a photosensor and a thermal detector.

50. A chromogenic vehicle sunroof to be installed in a vehicle surface having a surface contour and subject to a solar radiation source, comprising:

at least one of a chromogenic member having an optical property which varies according to at least one of an applied signal and a position;

a light-transmissive outer panel substantially spaced from said chromogenic member, said outer panel being dimensioned and disposed so as to overlap at least a substantial part of the chromogenic member, and having a predetermined non-flat surface substantially following the surface contour; and a trim member having at least one opening, said opening corresponding in both a position and a shape to the position and the shape of the chromogenic member, wherein said trim member overlaps and conceals at least a portion of said chromogenic member, wherein said outer panel is disposed between said solar radiation source and said chromogenic member when said vehicle sunroof is installed in said vehicle surface, wherein said chromogenic member comprises a flat, electrochromic member.

51. A chromogenic vehicle sunroof according to claim 50, further comprising at least one of a signal lead for applying the applied signal to said chromogenic member.

52. A chromogenic vehicle sunroof according to claim 51, further comprising signal applying means for causing said signal lead to be electrically connected to a circuit which supplies the applied signal when said sunroof is closed, and not when said sunroof is open.

53. A chromogenic vehicle sunroof as in claim 50, wherein said chromogenic member comprises two separate, flat electrochromic panels.

54. A chromogenic vehicle sunroof as in claim 50, further comprising a thermal break.

55. A chromogenic vehicle sunroof as in claim 54, wherein said thermal break comprises an air volume.

56. A chromogenic vehicle sunroof as in claim 50, wherein said vehicle surface is a roof of a vehicle.

57. A chromogenic vehicle sunroof to be installed in a vehicle roof surface having a surface contour and subject to exposure to a solar radiation source, comprising:

a chromogenic member comprising a first chromogenic panel and a second chromogenic panel, each said chromogenic panel having an optical property which varies according to a first and a second applied signal, respectively, and a position and a shape;

a light-transmissive outer panel substantially spaced from said chromogenic panels, said outer panel being dimensioned and disposed so as to overlap at least a substantial part of said chromogenic panels, and having a predetermined non-flat surface substantially following the surface contour;

a first control means for controlling said first chromogenic panel by varying said applied signal; and a second control means for controlling said second chromogenic panel by varying said applied signal, wherein each said control means is preferentially accessible to a different occupant of said vehicle, and wherein each said chromogenic panel comprises a flat, electrochromic member.

58. A chromogenic vehicle sunroof as in claim 57, further comprising:

a first light sensor effective to measure a first light intensity level and generate a first responsive signal;

a second light sensor effective to measure a second light intensity level and generate a second responsive signal; and wherein said first and second control means varies said first and said second applied signals correspondingly to said first and said second responsive signals respectively.

59. A chromogenic vehicle sunroof as in claim 57, further comprising:

a first light sensor effective to measure a first light intensity level and generate a first responsive signal;

a second light sensor effective to measure a second light intensity level and generate a second responsive signal; and a switch having a manual position and an automatic position, wherein said automatic position is effective to cause said first and second control means to vary said first and said second applied signals correspondingly to said first and said second responsive signals respectively.

60. A chromogenic vehicle sunroof as in claim 57 wherein said outer panel includes a tempered glass member.

61. A chromogenic vehicle sunroof as in claim 60 wherein said tempered glass member is tinted optically.

62. A chromogenic vehicle sunroof as in claim 57, further comprising a thermal break.

63. A chromogenic vehicle sunroof as in claim 62, wherein said thermal break comprises an air volume.

* * * * *

UNITED STATES PATENT AND TRADEMARK OFFICE
CERTIFICATE OF CORRECTION

PATENT NO. : 6,039,390

DATED : March 21, 2000

INVENTOR(S) : ANOOP AGRAWAL ET AL.

It is certified that error appears in the above-identified patent and that said Letters Patent is hereby corrected as shown below:

ON THE TITLE PAGE [56] References Cited:

FOREIGN PATENT DOCUMENTS, "1215621" should read --1-215621--.

COLUMN 2:

Line 32, "g." should read --G.--.

COLUMN 18:

Line 55, close up right margin; and
    Line 56, close up left margin.

COLUMN 19:

Line 48, "there between" should read --therebetween--.

COLUMN 20:

Line 32, "(poly" should read --(poly---; and
    Line 60, "a" should read --an--.

COLUMN 25:

Line 36, "he" should read --the--.

UNITED STATES PATENT AND TRADEMARK OFFICE
CERTIFICATE OF CORRECTION

PATENT NO. : 6,039,390
DATED : March 21, 2000
INVENTOR(S) : ANOOP AGRAWAL ET AL.

It is certified that error appears in the above-identified patent and that said Letters Patent is hereby corrected as shown below:

COLUMN 38:

Line 49, "claim 57" should read --claim 57,--; and
    Line 52, "claim 60" should read --claim 60,--.

Signed and Sealed this

Twenty-fourth Day of April, 2001

Attest:

NICHOLAS P. GODICI

Attesting Officer    Acting Director of the United States Patent and Trademark Office